United States Patent
Dai et al.

(10) Patent No.: US 8,499,289 B2
(45) Date of Patent: Jul. 30, 2013

(54) METHOD, DEVICE AND SYSTEM FOR REALIZING KERNEL ONLINE PATCHING

(75) Inventors: Huafei Dai, Shenzhen (CN); Wei Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 832 days.

(21) Appl. No.: 12/703,409

(22) Filed: Feb. 10, 2010

(65) Prior Publication Data

US 2010/0205587 A1  Aug. 12, 2010

(30) Foreign Application Priority Data

Feb. 10, 2009  (CN) .......................... 2009 1 0077423

(51) Int. Cl.
*G06F 9/45* (2006.01)
(52) U.S. Cl.
USPC ........................................................ 717/140
(58) Field of Classification Search
USPC ........................................................ 717/140
See application file for complete search history.

(56) References Cited

U.S. PATENT DOCUMENTS

| | | | | |
|---|---|---|---|---|
| 5,953,530 | A * | 9/1999 | Rishi et al. ..................... | 717/127 |
| 6,135,651 | A * | 10/2000 | Leinfelder et al. ............. | 717/168 |
| 6,438,664 | B1 | 8/2002 | McGrath et al. ............... | 711/154 |
| 6,691,308 | B1 * | 2/2004 | Kasper ........................... | 717/168 |
| 6,763,517 | B2 * | 7/2004 | Hines .............................. | 717/124 |
| 7,784,044 | B2 * | 8/2010 | Buban et al. ................... | 717/168 |
| 7,844,962 | B2 * | 11/2010 | Alexandre et al. ............. | 717/168 |
| 7,945,958 | B2 * | 5/2011 | Amarasinghe et al. ........ | 726/25 |
| 2002/0152455 | A1* | 10/2002 | Hundt et al. ................... | 717/131 |
| 2003/0037318 | A1* | 2/2003 | Ramasamy et al. ........... | 717/130 |
| 2004/0163080 | A1* | 8/2004 | Menon et al. .................. | 717/168 |
| 2006/0190765 | A1* | 8/2006 | Grossier et al. ................ | 714/8 |
| 2009/0259999 | A1* | 10/2009 | Srinivasan ..................... | 717/170 |

FOREIGN PATENT DOCUMENTS

CN  1475909 A  *  2/2004

OTHER PUBLICATIONS

R. Krishnakumar, "Kernel korner: kprobes—a kernel debugger", Linux Journal, vol. 2005 Issue 133, May 2005.*
Tamches et al. "Fine-Grained Dynamic Instrumentation of Commodity Operating System Kernels", USENIX Association, Berkeley CA, 1999.*
Office Action issued in corresponding Chinese Patent Application No. 200910077423.2, mailed Apr. 27, 2012.
Arnold, "Ksplice: An Automatic System for Rebootless Kernel Security Updates" Massachusetts Institute of Technology Department of Electrical Engineering and Computer Science, DSpace@MIT, 2008.

* cited by examiner

*Primary Examiner* — Anna Deng
*Assistant Examiner* — Junchun Wu
(74) *Attorney, Agent, or Firm* — Brinks Hofer Gilson & Lione

(57) ABSTRACT

A method, a device, and a system for realizing kernel online patching are provided. The method includes loading a pre-generated patch file in an operating system, setting a first breakpoint at an execution start position of the primitive function when a system thread executes the primitive function and a breakpoint exception occurs during the thread execution process due to the first breakpoint, modifying a returning execution address of the first breakpoint into the destination address of the patch function corresponding to the primitive function according to the first corresponding relation, and removing the first breakpoint. The kernel online patching implementation has a small impact on the normal operation of the operating system. The patch function becomes valid without restarting the operating system, thereby satisfying the high reliability requirements of carrier-class products.

22 Claims, 13 Drawing Sheets

METHOD, DEVICE AND SYSTEM FOR REALIZING KERNEL ONLINE PATCHING

CROSS-REFERENCE TO RELATED APPLICATION

This application claims priority to Chinese Patent Application No. 200910077423.2, filed on Feb. 10, 2009, which is hereby incorporated by reference in its entirety.

FIELD OF THE DISCLOSURE

The present disclosure relates to the field of computer technology, and more particularly to a method, a device, and a system for realizing kernel online patching.

BACKGROUND OF THE DISCLOSURE

A kernel is a core of an operating system responsible for managing the system process, memory, device driver, file, network system and so on, and determines the performance and stability of the system. A method of realizing kernel patching by, for example, replacing the kernel and restarting the system fails to meet the high reliability requirements of carrier-class products. As such, a patching technology capable of immediately upgrading the kernel function of the operating system during the operation of the kernel is needed. In an existing kernel hot patching technology, the kernel function is renovated in the form of a memory patch during the operation of the kernel instead of replacing the whole kernel, thereby improving the system reliability. Therefore, the kernel hot patching technology has been widely applied in renovating the kernel function of the operating system in the carrier-class products.

A prior art technique based on the kernel hot patching technology is implemented as follows. Two source codes (including a source code before the modification of a kernel and a patch source code after the modification of the kernel) are compiled, and all object files in the compiled two source codes are compared with each other to determine an object file that is different among the two source codes. The determined object file is then connected to a script file for realizing an auto-loading function (e.g. ksplice kernel module) to generate a patch package file that can be identified by a Linux system and has an auto-loading function. Afterwards, the Linux system is restarted, and the patch package file is triggered by an external control command (e.g. insmod command) to be auto-loaded to the Linux system and become valid automatically. In the patch validation process, a stop_machine_run system function of the Linux system is employed to create a non-interrupted thread with the highest priority for each CPU in the system. Then, call stacks of all the created threads in the system are checked to see whether a primitive function of the kernel that has the same name as the patch function defined in the patch package file is executed in the system. If not, the primitive function is replaced by the patch function. Otherwise, the non-interrupted thread with the highest priority running on each CPU is exited, and the functions executed in the created threads are checked again after a period of time elapsed. If the repeated checking times exceeds a preset number, the kernel patching fails.

During the kernel hot patching in the prior art, the operation of all the other threads in the system is interrupted, and the normal operation of the operating system is seriously affected, thereby detracting from high reliability requirements of the carrier-class products.

SUMMARY OF THE DISCLOSURE

Accordingly, the present disclosure is directed to a method, a device, and a system for realizing kernel online patching, in which a kernel online patching process is implemented without affecting a normal operation of an operating system.

In an embodiment, the present disclosure provides a method for realizing kernel online patching which includes loading a pre-generated patch file in an operating system, wherein the patch file includes a patch function corresponding to a primitive function of a system kernel and a first corresponding relation between a source address of the primitive function and a destination address of the patch function, setting a first breakpoint at an execution start position of the primitive function, and modifying a returning execution address of the first breakpoint into the destination address of the patch function corresponding to the primitive function according to the first corresponding relation, and removing the first breakpoint, when a system thread executes the primitive function and a breakpoint exception occurs during the thread execution process due to the first breakpoint.

In an embodiment, the present disclosure provides a method for generating kernel patch which includes compiling a patch source code to obtain an object file and generating a patch file according to the object file, wherein the patch file comprises a patch function corresponding to a primitive function of a system kernel and a first corresponding relation between a source address of the primitive function and a destination address of the patch function.

In an embodiment, the present disclosure provides a kernel online patching management device which includes a loading module configured to load a pre-generated patch file in an operating system, wherein the patch file includes a patch function corresponding to a primitive function of a system kernel and a first corresponding relation between a source address of the primitive function and a destination address of the patch function, a first breakpoint setting module configured to set a first breakpoint at an execution start position of the primitive function, and a patching module configured to modify a returning execution address of the first breakpoint into the destination address of the patch function corresponding to the primitive function according to the first corresponding relation and remove the first breakpoint, when a system thread executes the primitive function and a breakpoint exception occurs during the thread execution process due to the first breakpoint.

In an embodiment, the present disclosure provides a kernel patch generation device which includes a compiling module configured to compile a patch source code to obtain an object file and a patch file generation module configured to generate a patch file according to the object file, wherein the patch file includes a patch function corresponding to a primitive function of a system kernel and a first corresponding relation between a source address of the primitive function and a destination address of the patch function.

In an embodiment, the present disclosure provides a system for realizing kernel online patching which includes a kernel patch generation device configured to compile a patch source code to obtain an object file and generate a patch file according to the object file, wherein the patch file includes a patch function corresponding to a primitive function of a system kernel and a first corresponding relation between a source address of the primitive function and a destination address of the patch function and a kernel online patching management device configured to load the patch file in an operating system, set a first breakpoint at an execution start position of the primitive function, modify a returning execution address of the first breakpoint into the destination address of the patch function corresponding to the primitive function according to the first corresponding relation when a system thread executes the primitive function and a breakpoint exception occurs during the thread execution process due to the first breakpoint, and remove the first breakpoint.

In the method, the device, and the system for realizing kernel online patching of the present disclosure, a kernel file may be patched during the operation of the kernel of an operating system (i.e., online patching). As the kernel online patching is realized by setting a breakpoint and modifying a returning execution address of the breakpoint after the kernel online patching is completed, the kernel file can be patched online while maintaining the normal operation of the system. In this manner, the patch function becomes valid without restarting the operating system, thereby satisfying the high reliability requirements of carrier-class products.

BRIEF DESCRIPTION OF THE DRAWINGS

To illustrate the technical solutions according to the embodiments of the present disclosure or in the prior art more clearly, the accompanying drawings required for describing the embodiments are introduced below briefly. Apparently, the accompanying drawings in the following descriptions show some of the embodiments of the present disclosure, and persons of ordinary skill in the art can obtain other drawings according to the accompanying drawings without creative efforts.

DETAILED DESCRIPTION OF THE EMBODIMENTS

The technical solutions of the present disclosure will be clearly described below with reference to the accompanying drawings. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

Figure 1:
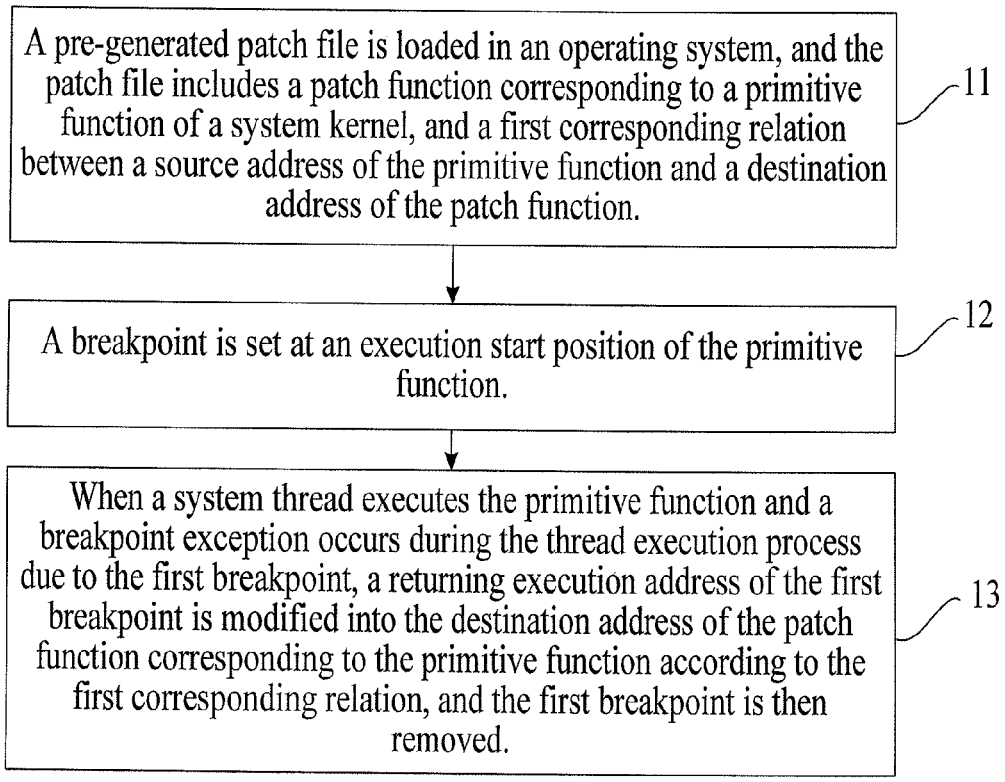
FIG. 1 is a flow chart showing a method for realizing kernel online patching according to a first embodiment of the present disclosure.

FIG. 1 is a flow chart of a method for realizing kernel online patching according to a first embodiment of the present disclosure. Referring to FIG. 1, the method includes the following blocks.

In Block 11, a pre-generated patch file is loaded in an operating system. The patch file includes a patch function corresponding to a primitive function of a system kernel and a first corresponding relation between a source address of the primitive function and a destination address of the patch function.

Particularly, a source code is compiled in advance to generate an object file required to be patched, and then a patch file capable of running in the system after being loaded is generated according to the object file. The patch file includes a patch function corresponding to a primitive function of a system kernel and a first corresponding relation between a source address of the primitive function and a destination address of the patch function. The generated patch file is loaded into the operating system.

When the patch file is loaded into the operating system, a patch region in the operating system is dynamically extended. For example, when a memory capacity of the patch region in the system is smaller than a size of a space required by the patch file during running, a new memory is allocated to the patch region for loading the patch file. A default patch loading address is then compared with the new memory address of the patch region so that if the two addresses are identical, patch data carried in the patch file is replicated to the new memory of the patch region. Otherwise, a destination address of the patch data carried in the patch file is relocated according to shift relocation information, and then the relocated patch data is replicated to the new memory of the patch region. The patch data includes a patch function corresponding to a primitive function of a system kernel and a first corresponding relation between a source address of the primitive function and a destination address of the patch function.

After the patch file has been loaded into the operating system, a validation control of the patch file is performed in Blocks 12 and 13. That is, during the operation of the kernel of the operating system, a corresponding primitive function of the system kernel is replaced by the patch function in the patch file so that the defects of a kernel file are overcome or the functions thereof are upgraded through the patch function.

In Block 12, a breakpoint is set at an execution start position of the primitive function. The breakpoint is a first breakpoint in this embodiment of the present disclosure.

The first breakpoint is mainly set for validating the patch function.

A kernel thread with a common priority may be created in the operating system to control the validation of the patch file. In order to realize the patching of the kernel during the operation of the kernel (that is, online patching), a breakpoint may be set at a start position of the primitive function. When the thread executes the function required to be patched, a breakpoint exception occurs and, through processing the breakpoint exception, the validation control of the patch file may be performed.

In Block 13, when a system thread executes the primitive function and a breakpoint exception occurs during the thread execution process due to the first breakpoint, a returning execution address of the first breakpoint is modified into the destination address of the patch function corresponding to the primitive function according to the first corresponding relation, and the first breakpoint is then removed.

When the thread executes the primitive function set with the breakpoint and a breakpoint exception occurs due to the first breakpoint, a returning execution address of the first breakpoint is modified into the destination address of the patch function corresponding to the primitive function required to be patched. Therefore, when the thread or any other thread executes the primitive function, the given thread may automatically jump to execute the patch function corresponding to the primitive function so as to accomplish the patch validation process of the primitive function.

In this embodiment, the kernel file can be patched online during the running of the kernel of the operating system. The kernel online patching may be realized by creating a common thread instead of specifically creating a thread with the highest priority for each CPU in the system that may result in an interruption of the running of the original thread in the system, which thus shortens the response time of the system thread and exerts a small impact on the normal running of the operating system. Moreover, as the kernel online patching is realized by setting a breakpoint and modifying a returning execution address of the breakpoint, after the kernel online patching is completed, the patch function becomes valid without restarting the operating system, thereby satisfying the high reliability requirements of carrier-class products.

The executing entity of this embodiment may be a kernel patching management module that can be identified by the operating system and has a function of loading a patch file. The operating system first loads the kernel patching management module, and then performs loading, validation, recovery, and other control processes on the patch file through the kernel patching management module. In this manner, an operating system that does not support hot patching may also load the kernel patching management module, and then realize the kernel online patching through the kernel patching management module based on the technical solution of this embodiment, thereby improving the applicability of the kernel online patching in different operating systems.

Figure 2:
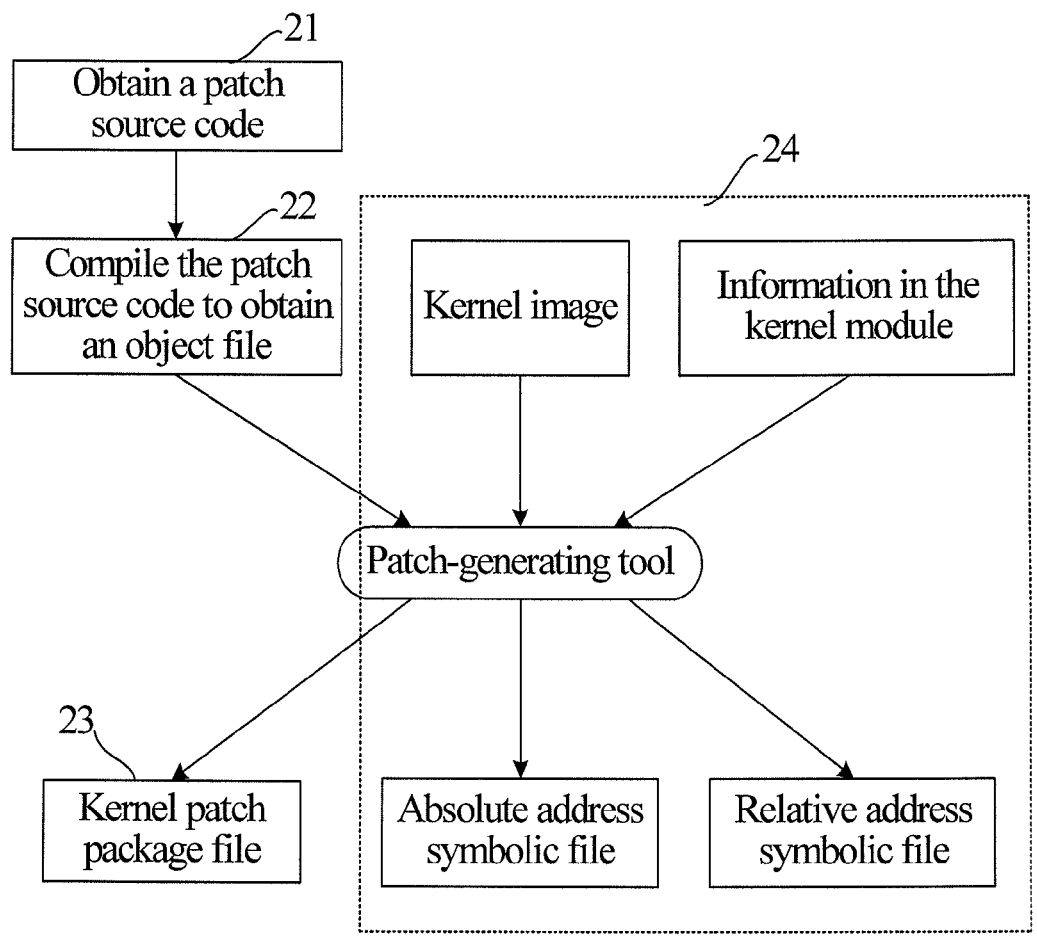
FIG. 2 is a block diagram showing a process of generating a patch file according to a second embodiment of the present disclosure.

FIG. 2 is a block diagram of a process of generating a patch file according to a second embodiment of the present disclosure. The technical solution of this embodiment is applicable to generating the patch file applied in the first embodiment of the present disclosure. Referring to FIG. 2, the following blocks are included.

In Block 21, information about a patch source code is obtained.

When a kernel of an operating system has inadequate functions or defects, a source code that results in the function inadequacy or defects of the kernel is first modified first where the modified source code is the patch source code of this embodiment.

In Block 22, the patch source code is compiled to obtain an object file. The object file includes symbolic information and relocation information of the patch function of the patch source code.

In this embodiment, merely the patch source code is compiled, for example, in an environment for compiling a kernel image, so as to output an object file. The object file includes symbolic information and relocation information of the patch function of the patch source code. The function required to be patched may be determined according to the symbolic information and the relocation information. The symbolic information includes, for example, a name, a size, and a storage address of the function. The relocation information includes a position of a relocation instruction and required symbolic information and so on.

In Block 23, a patch file is generated according to the object file. The patch file includes shift relocation information corresponding to the symbolic information and the relocation information, a predetermined default patch loading address, information about a size of a space required by the patch file during running, a patch function corresponding to a primitive function of a system kernel, and a first corresponding relation between a source address of the primitive function and a destination address of the patch function.

When the patch file is generated, a default patch loading address is predetermined for the patch file. All the symbolic information and relocation information in the object file are converted into the shift relocation information based on the default patch loading address, and the shift relocation information is written into the patch file. The patch file also carries information about a size of a space required by the patch file during running so as to ensure that the system has sufficient memory space (that is, the space of the patch region) for supporting the running of the patch file before the kernel patching management module loads the patch file into the operating system.

The generation of the patch file is completed in Blocks 21 to 23.

In order to facilitate the generation of the patch file in the next time when the patch file is generated, Block 24 is further included.

In Block 24, an absolute address symbolic file required by the generation of the patch file in the next time is output according to a pre-obtained kernel image of the operating system, and a relative address symbolic file required by the generation of the patch file in the next time is output according to pre-obtained symbolic information in a kernel module.

The output absolute address symbolic file and relative address symbolic file are stored as the reference for determining the default patch loading address and computing the shift relocation information during the generation of the patch file in the next time. The absolute address symbolic file includes all symbolic information in the kernel image, and the relative address symbolic file includes all symbolic information in the kernel module.

The executing entity of this embodiment may be a patch-generating tool. The patch-generating tool only needs to compile one copy of source code (i.e. the source code before the modification of the kernel) to obtain an object file instead of compiling two copies of source codes (i.e. the source code before the modification of the kernel and the patch source code after the modification of the kernel), thereby shortening the compiling time of the source code and reducing the compiling cost. Meanwhile, during the generation of the patch file, the symbolic file information required by the generation of the patch file in the next time is output in order to facilitate the generation of the patch file in the next time.

Figure 3:
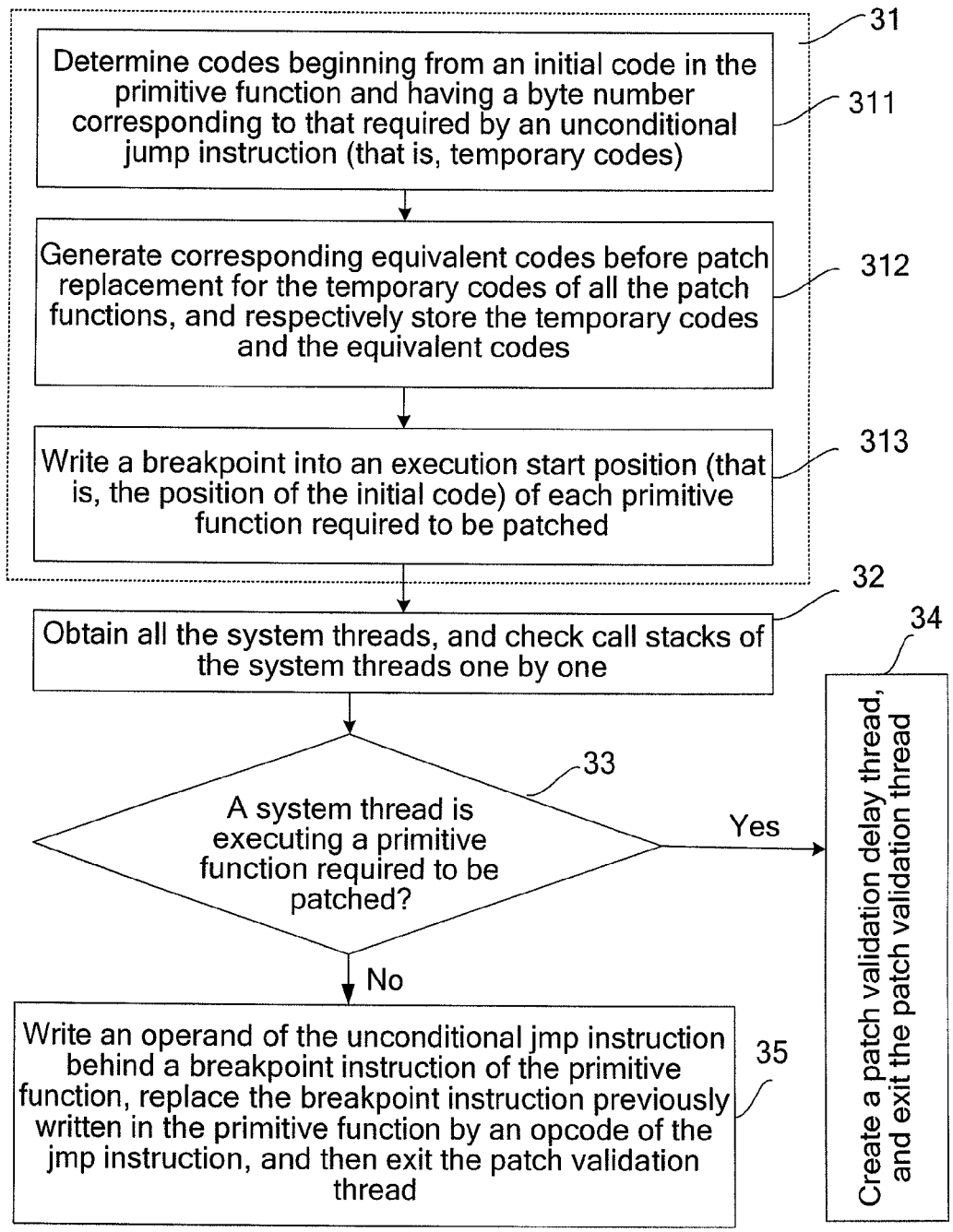
FIG. 3 is a flow chart showing a process of realizing kernel patch validation control according to a third embodiment of the present disclosure.

FIG. 3 is a flow chart of a process of realizing kernel patch validation control according to a third embodiment of the present disclosure. In this embodiment, the kernel patch validation control is implemented by using a kernel thread with a common priority. The thread is referred to as a patch validation thread. Referring to FIG. 3, the patch validation thread performs the following blocks during running.

In Block 31, during running, the patch validation thread writes a breakpoint at an execution start position of a corresponding primitive function of a system kernel according to information about the function required to be patched in a patch file. Next, Block 32 is performed.

Block 31 further includes Blocks 311 to 313.

In Block 311, before writing a first breakpoint into the primitive function, the thread determines codes beginning from an initial code in the primitive function and having a byte number corresponding to that required by an unconditional jump instruction (jmp instruction). The determined codes are temporary codes of this embodiment.

The jmp instruction includes an opcode and an operand. The opcode indicates that the instruction is configured to perform an unconditional jump, and the operand determines a destination address of the jump. The jmp instruction is written into the primitive function and overwrites a part of the original codes in the primitive function. The overwritten original codes are the temporary codes of this embodiment, and a backup for the temporary codes may be made.

In Block 312, according to the temporary codes in all the determined functions required to be patched, the thread generates corresponding equivalent codes before patch replacement for each patch function and then stores the equivalent codes and the temporary codes respectively.

The temporary codes and the equivalent codes are different from each other and also associated with each other. The equivalent codes are stored for use in the patch validation of the primitive function. After executing the equivalent codes, the thread jumps under a jmp instruction to execute the other codes in the primitive function that are not overwritten by the jmp instruction. The temporary codes are stored for use in recovering the patch function to the primitive function in the subsequent process. The temporary codes are merely a backup for an original instruction of the primitive function overwritten by the jmp instruction.

A second corresponding relation among a destination address of the equivalent codes, a source address of the primitive function, and a destination address of the patch function is established and a third corresponding relation among the temporary codes, the destination address of the equivalent codes, the source address of the primitive function, and the destination address of the patch function is also established.

During the replacement of the primitive function by the patch function, the equivalent codes achieve the same function as the temporary codes required in the invocation or execution of the primitive function. In this block, before setting the breakpoint, the patch validation thread respectively generates and stores the equivalent codes corresponding to the temporary codes for all the primitive functions required to be patched which is helpful for returning to execute the primitive functions upon actual requirements and ensuring that the functions executed in the patch validation thread satisfy the requirement of atomicity. The atomicity refers to the consistency of versions of a plurality of functions invoked by a thread which ensures that all the functions currently invoked by the thread are, for example, primitive functions, all the functions currently invoked by the thread are, for example, patch functions, or the like, thereby avoiding an invocation failure resulting from the different versions of functions that are currently invoked by the thread.

In this embodiment, before setting the breakpoint, the thread respectively determines and stores the temporary codes for all the primitive functions required to be patched which is helpful for recovering the patch function to the primitive function before patching according to the stored temporary codes after the patch function becomes valid.

The equivalent codes ensure the atomicity of the thread execution process and the temporary codes are employed for the recovery of the patch function. A method for generating the equivalent codes may be obtained with reference to the description of an embodiment shown in FIG. 4. When the thread invokes a plurality of functions in the validation process of the patch function, a method for ensuring the atomicity among the invoked functions by using the equivalent codes may be obtained with reference to the description of an embodiment shown in FIG. 7. A method for recovering the patch function by using the temporary codes may be obtained with reference to the description of an embodiment shown in FIG. 8.

In Block 313, the first breakpoint is respectively written into an execution start position of each primitive function required to be patched.

When a certain thread invokes the primitive function set with the first breakpoint, an interruption is triggered by the first breakpoint, and then a validation control of the patch file is performed through processing the breakpoint exception.

In Block 32, all the threads currently running in the system (referred to as "system threads" hereinafter) are obtained, and call stacks of the system threads are checked one by one.

The call stacks of the current system threads are checked one by one in order to ensure the integrity of the functions required to be patched.

In Block 33, it is determined whether a system thread is executing a primitive function required to be patched according to the call stacks of the thread. If a system thread is executing a primitive function required to be patched according to the call stacks for the thread, Block 34 is performed. Otherwise, Block 35 is performed.

To avoid interrupting the normal operation of the system thread, a patching occasion of the primitive function is determined depending upon different circumstances considering whether the system thread is executing the primitive function required to be patched.

In Block 34, a kernel thread configured to perform patch validation delay control, that is, a kernel thread (referred to as a "patch validation delay thread" hereinafter) configured to delay the replacement of a primitive function by a corresponding patch function is created. The patch validation delay thread selects an appropriate time to perform the patch validation delay control. Afterwards, the patch validation thread is exited, and the process ends.

If the system thread is executing a primitive function required to be patched, the execution priority of the system thread is ensured, and the primitive function is patched after the execution of the system thread is finished, thereby maintaining the normal operation of the current system thread and improving the success ratio of the patching. A method for realizing patch validation delay control may be obtained with reference to the description of an embodiment shown in FIG. 6.

In Block 35, the operand of the unconditional jmp instruction is written behind a breakpoint instruction of the primitive function. The operand of the jmp instruction is a shift between the source address of the primitive function and the destination address of the patch function. The breakpoint instruction previously written in the primitive function is then replaced by the opcode of the jmp instruction. Afterwards, the patch validation thread is exited, and the process ends.

If the system thread does not execute the primitive function required to be patched, the primitive function is patched. If a certain thread invokes a function added with the jmp instruction, the thread unconditionally jumps to execute the patch function according to the operand of the jmp instruction.

In this block, the operand of the jmp instruction is first written into the primitive function required to be patched, and then the opcode of the jmp instruction is written therein, so as to avoid interrupting the execution of the current system thread, and effectively ensure that a jump failure may not occur when the thread invokes a function under patching during the writing process of the jmp instruction.

In view of the above, if the current system thread does not execute the primitive function required to be patched, the patch validation thread replaces the jmp instruction with the breakpoint in the primitive function in which the operand of the jmp instruction is a shift between the source address of the primitive function and the destination address of the patch function. Otherwise, the patch validation thread creates another thread with a common priority to control the patch validation delay process in order to improve the success ratio of the kernel online patching.

In this embodiment, during the kernel online patching, a thread with a common priority is configured to perform the validation control on the kernel online patching without interrupting the running of the original CPU threads of the system, thereby shortening the response time of the system thread and exerting a small impact on the normal operation of the operating system. Moreover, in this embodiment, as the kernel online patching is realized by setting a breakpoint and modifying a returning execution address of the breakpoint, after the kernel online patching is completed, the patch function becomes valid without restarting the operating system, thereby satisfying the high reliability requirements of carrier-class products.

Figure 4:
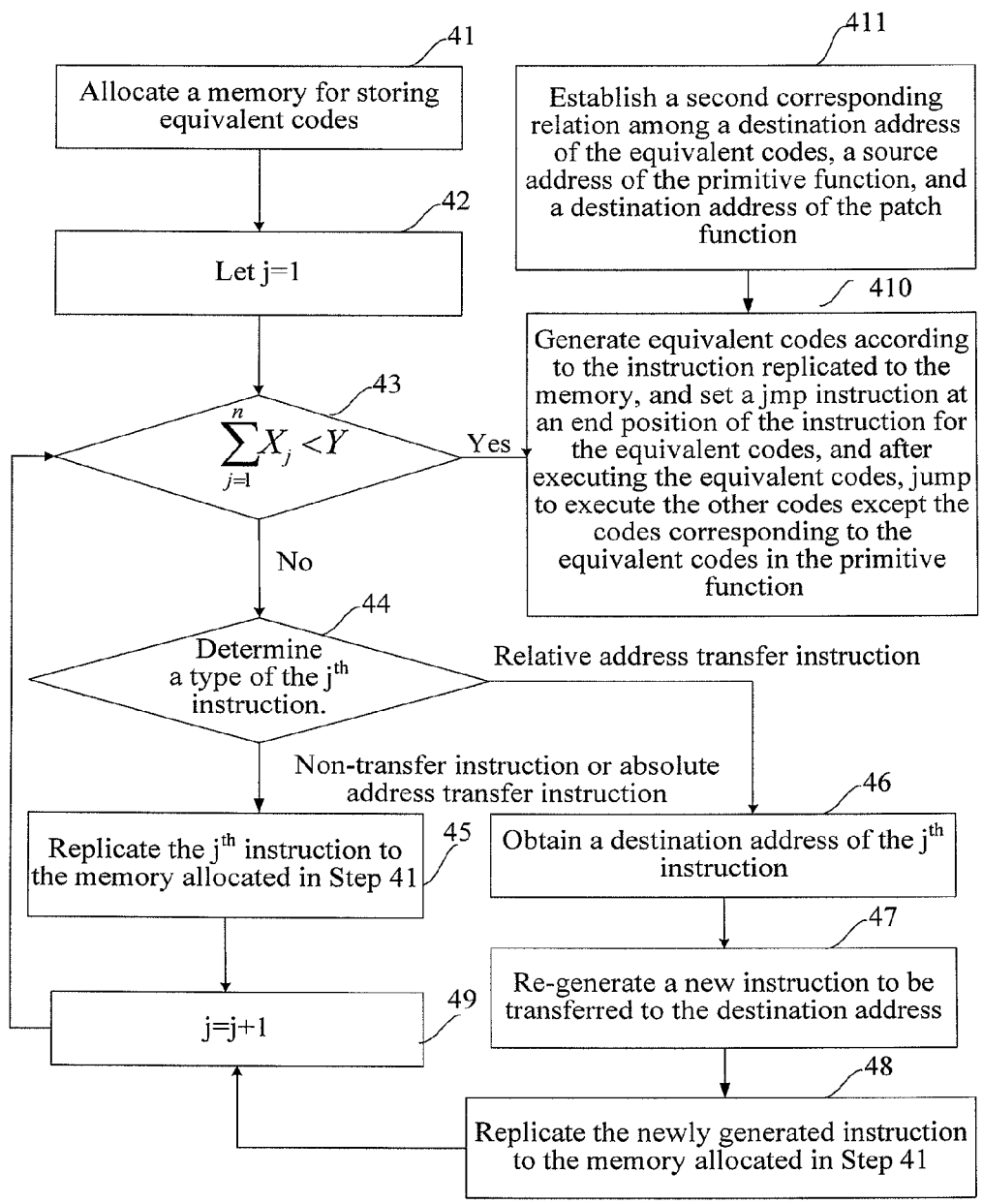
FIG. 4 is a flow chart showing a method for generating equivalent codes according to a fourth embodiment of the present disclosure.

FIG. 4 is a flow chart of a method for generating equivalent codes according to a fourth embodiment of the present disclosure. In this embodiment, equivalent codes of a primitive function are generated by a patch validation thread. Referring to FIG. 4, the method includes the following blocks.

In Block 41, a memory is allocated in an operating system. The allocated memory is configured to store equivalent codes corresponding to temporary codes in the determined primitive function required to be patched. The equivalent codes can be executed to realize the same function as the temporary codes, and the difference there-between lies in the following aspects. The equivalent codes are stored for use in the patch validation of the primitive function. After executing the equivalent codes, the thread jumps under a jmp instruction to execute the other codes in the primitive function that are not overwritten by the jmp instruction. The temporary codes are stored for recovering the patch function to the primitive function in the subsequent process. The temporary codes are merely a backup for an original instruction of the primitive function overwritten by the jmp instruction.

It is assumed that a primitive function required to be patched includes n instructions, n is an integer greater than 0, $X_j$ represents a length of a $j^{th}$ instruction, and Y represents a length of a predetermined unconditional jump instruction.

In Block 42, let j=1.

In this block, the instructions of the function are analyzed one by one from a starting position of the function.

In Block 43, it is determined whether the following condition is satisfied:

$$\sum_{j=1}^{n} X_j < Y,$$

where 1≦k≦n. If the condition is satisfied, Block 410 is performed. Otherwise, Block 44 is performed.

In this block, it is determined whether a total instruction length $$\sum_{j=1}^{n} X_j$$

from the first instruction to the $j^{th}$ instruction of the function is greater than the length Y of the unconditional jump instruction.

In Block 44, a type of the $j^{th}$ instruction of the function is determined. If the type of the $j^{th}$ instruction is a non-transfer instruction or an absolute address transfer instruction, Block 45 is performed. If the type of the $j^{th}$ instruction is a relative address transfer instruction, Block 46 is performed.

In Block 45, the $j^{th}$ instruction is replicated to the memory allocated in Block 41, and Block 49 is performed.

The non-transfer instruction or absolute address transfer instruction does not need to perform the destination address relocation according to a memory address configured to store the equivalent codes. Therefore, the non-transfer instruction or absolute address transfer instruction is directly replicated to the memory allocated in Block 41.

In Block 46, a destination address of the $j^{th}$ instruction is obtained. Due to the variation of the storage address, the relative address transfer instruction changes correspondingly according to the varied storage address. That is, a relative relation between the storage address of the relative address transfer instruction and the destination address where the relative address transfer instruction is required to be transferred needs to be re-determined.

In Block 47, a new instruction to be transferred to the destination address is re-generated according to the address of the equivalent codes and the destination address of the $j^{th}$ instruction stored in the memory allocated in Block 41.

In this block, the relative relation between the storage address of the relative address transfer instruction and the destination address where the relative address transfer instruction is required to be transferred is updated.

In Block 48, the newly generated instruction is replicated to the memory allocated in Block 41, and Block 49 is performed.

In Block 49, j=j+1, and Block 43 is performed.

In Block 410, equivalent codes are generated according to the instruction replicated to the memory, and a jmp instruction is set at an end position of the instruction for the equivalent codes. Thus, after executing the equivalent codes, the thread jumps to execute the other codes except the codes corresponding to the equivalent codes in the primitive function.

In Block 411, a second corresponding relation among a destination address of the equivalent codes, a source address of the primitive function, and a destination address of the patch function is established.

The equivalent codes of the primitive function are generated, and the process ends.

In this embodiment, a breakpoint is set in the primitive function required to be patched, and equivalent codes are generated through the codes overwritten by the unconditional jump instruction in the primitive function. Thus, during the patch file validation process, if the system thread invokes a plurality of functions, the atomicity among the plurality of functions can be ensured. Furthermore, the codes overwritten by the unconditional jump instruction (that is, temporary codes defined in this embodiment) may be backed up, and the temporary codes may also be stored in the memory allocated in Block 41 so that the patch function already adopted in the patching can be recovered to the primitive function before patching according to the temporary codes as the backup depending upon actual requirements.

Figure 5:
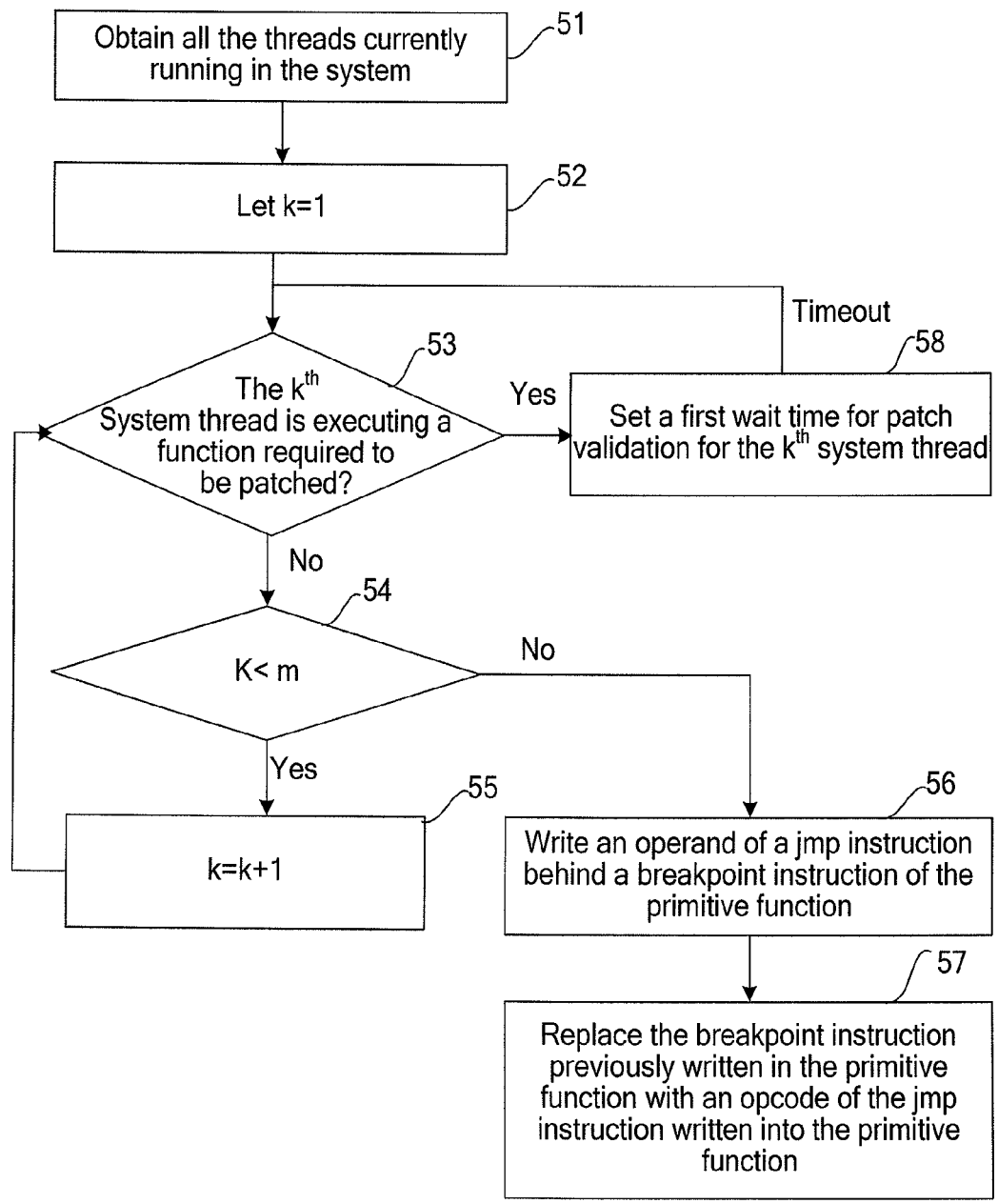
FIG. 5 is a flow chart showing a method for realizing patch validation delay control according to a fifth embodiment of the present disclosure.

FIG. 5 is a flow chart of a method for realizing patch validation delay control according to a fifth embodiment of the present disclosure. In this embodiment, a thread with a common priority is configured to perform the patch validation delay control, and the thread is referred to as a patch validation delay thread. Referring to FIG. 5, the following blocks are performed during the execution of the patch validation delay thread.

In Block 51, all the threads currently running in the system are obtained.

After all the current system threads are obtained, call stacks of the obtained system threads are checked one by one. It is assumed that m system threads are obtained, in which m is an integer greater than 0, and k represents a sequence number of a currently analyzed thread.

In Block 52, let k=1.

In Block 53, it is determined whether a $k^{th}$ system thread is executing a function required to be patched according to a patch file. If the $k^{th}$ system thread is executing a function required to be patched according to a patch file, Block 58 is performed. Otherwise, Block 54 is performed.

In Block 54, it is determined whether k<m is satisfied or not, and if k<m, Block 55 is performed. Otherwise, Block 56 is performed.

In Block 55, k=k+1, and Block 53 is performed.

In Block 56, an operand of a jmp instruction is written behind a breakpoint instruction of the primitive function required to be patched. The operand of the jmp instruction includes a shift between a source address of the primitive function required to be patched and a destination address of a patch function in the patch file.

In Block 57, after the jmp instruction is successfully written, an opcode of the jmp instruction written into the primitive function is configured to replace the breakpoint instruction previously written in the primitive function, and the process ends.

In Block 58, a first wait time for patch validation is set for the kth system thread, and Block 53 is repeated after the first wait time has been set.

The first wait time for patch validation of the system thread is determined according to a time required by the thread to execute the function, a scheduling frequency of the CPU, or other factors. For example, the first wait time for patch validation is set to 10 milliseconds (ms).

In this embodiment, when the system thread is executing a function currently required to be patched, a first wait time for patch validation delay is set so that the patch validation process is performed when the system thread does not invoke the function currently required to be patched, and the system thread is prevented from being interrupted during the patch validation process, thereby shortening the response time of the system interruption, and improving the system performance.

Figure 6:
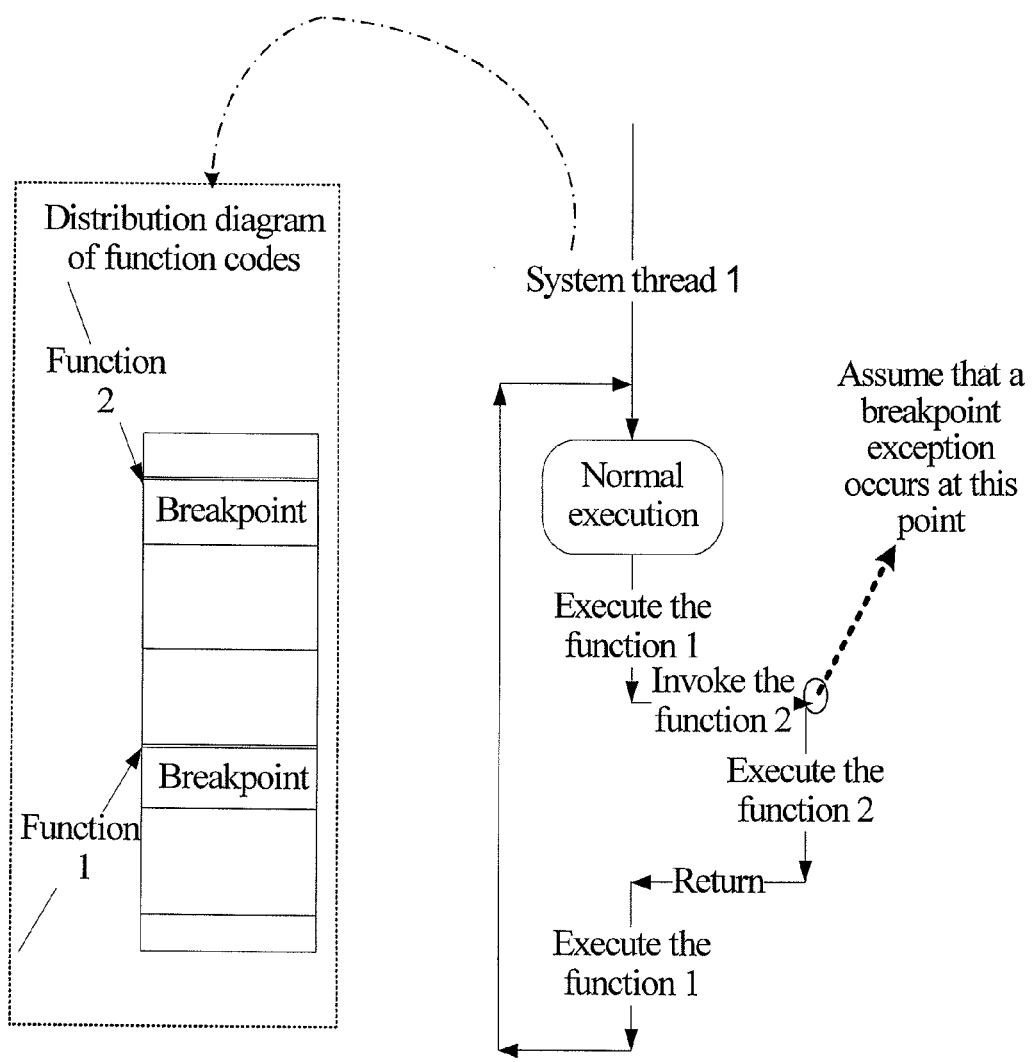
FIG. 6 is a schematic view showing an application scenario of processing a breakpoint exception in the kernel patch validation control process according to the present disclosure.

FIG. 6 is a schematic view of an application scenario of processing a breakpoint exception in the kernel patch validation control process according to the present disclosure.

Referring to FIG. 6, it is assumed that, a patch validation thread acquires, based on checking of the call stacks of the system threads, that a system thread 1 invokes two functions in a normal execution, that is, a function 1 (Func1) and a function 2 (Func2). The normal execution flow of the system thread 1 includes: executing the function 1→invoking the function 2→executing the function 2→invoking the function 1→executing the function 1, which is repeated.

In the patch validation control process of the patch validation thread, a breakpoint is respectively added at an execution start position of the function 1 and the function 2. As no interruption occurs in the patch validation control process of the patch validation thread, the function 1 and the function 2 currently executed by the patch validation thread may be primitive functions before the modification (referred to as "primitive functions 1 and 2" hereinafter), and may also be patch functions after the modification (referred to as "patch functions 1 and 2" hereinafter).

As the patch validation thread writes the breakpoints in the functions, in some application scenarios, for example, during the online replacement of the primitive function and the patch function performed by the patch validation thread, the atomicity of the functions invoked or executed by the patch validation thread needs to be ensured, and primitive functions with no breakpoints are required to be invoked or executed.

The so-called atomicity refers to the consistency of versions of functions currently executed by a thread so as to ensure synchronization of parameter information invoked during the operation of the thread. In order to ensure the atomicity, the version information about the function 1 and the function 2 executed by the patch validation thread needs to remain in sync. In other words, the patch validation thread executes the primitive function 1 and the primitive function 2 or executes the patch function 1 and the patch function 2, in order to respectively ensure the synchronization between the parameter information of the function 1 and that of the function 2. If the function 1 executed by the patch validation thread is the primitive function 1, while the function 2 executed by the patch validation thread is the patch function 2, an error in the invocation of the function 2 occurs due to the asynchronous parameter information between the primitive function 1 and the patch function 2, thereby resulting in an execution failure of the thread.

Figure 7:
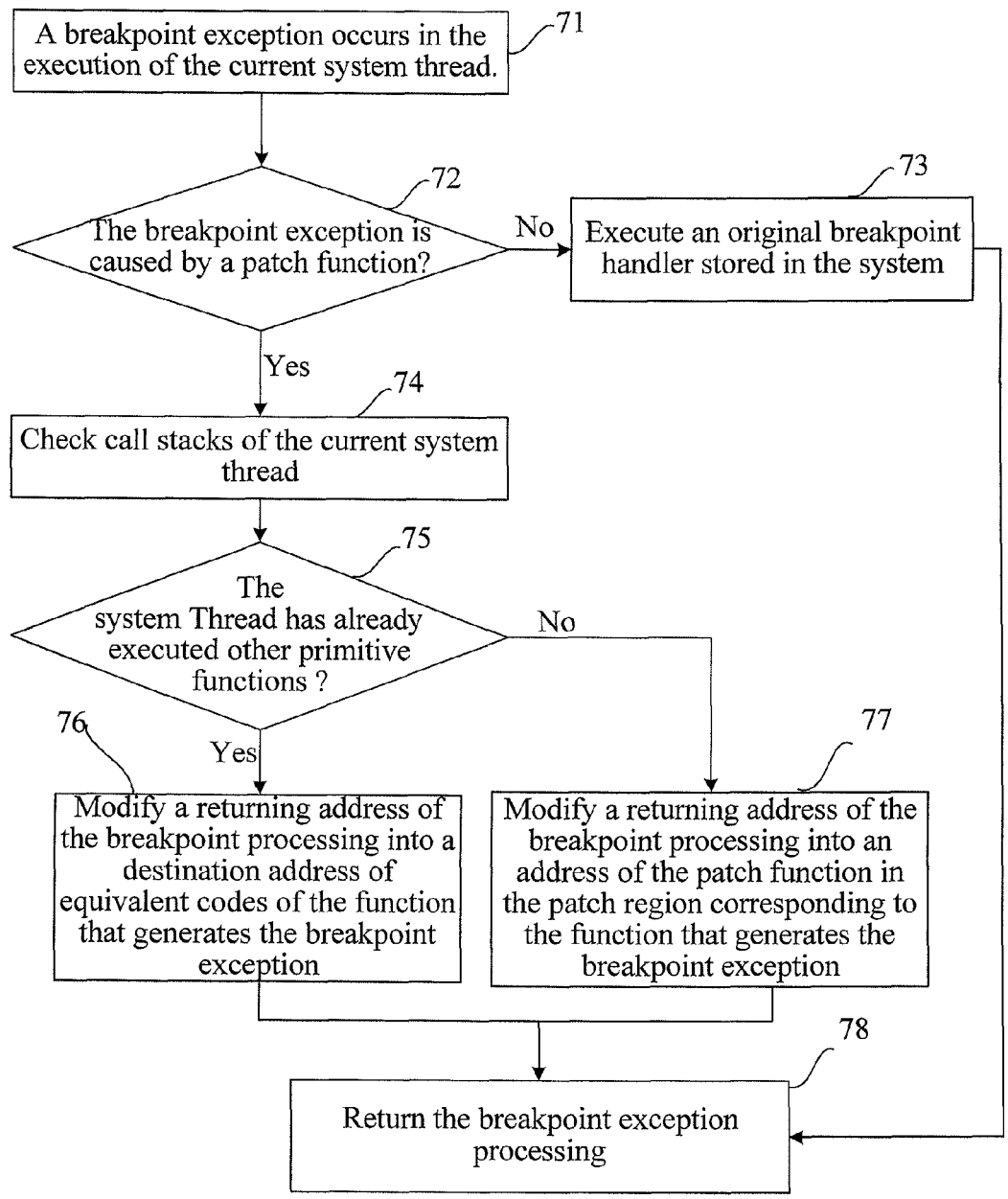
FIG. 7 is a flow chart showing a method for processing a breakpoint exception according to a sixth embodiment of the present disclosure.

FIG. 7 is a flow chart of a method for processing a breakpoint exception according to a sixth embodiment of the present disclosure. During a validation delay period set by the patch validation delay thread (e.g. during a first wait time set by the patch validation delay thread) when a breakpoint exception occurs during the operation of the system thread in the application scenario as shown in FIG. 6 due to the first breakpoint set in the patch validation process, the method of this embodiment is applied for processing the breakpoint exception.

It is assumed that a current system thread invokes two functions in a normal execution, that is, a function 1 (Func1) and a function 2 (Func2). The normal execution flow of the current system thread includes: executing the function 1→invoking the function 2→executing the function 2→invoking the function 1→executing the function 1, which is repeated.

In this embodiment, the following blocks are performed during the execution of the current system thread.

In Block 71, it is assumed that a breakpoint is discovered when the current system thread executes the function 2.

In Block 72, a cause of the breakpoint exception is determined, and if the breakpoint exception is caused by a breakpoint set when the patching is required, Block 74 is performed. Otherwise, Block 73 is performed.

In Block 73, the breakpoint exception is processed by a breakpoint exception processing method in the prior art, and Block 78 is performed after the processing is finished.

In Block 74, call stacks of the current system thread are checked.

If the processing of the breakpoint exception aims at "replacing" the primitive function with the patch function (i.e. patch validation), Block 75 is further performed following Block 74.

In Block 75, according to the call stacks of the current system thread, it is determined whether the current system thread has executed other primitive functions (e.g. the primitive function 1) before the breakpoint exception occurs. If the current system thread has executed other primitive functions before the breakpoint exception occurs, Block 76 is performed. Otherwise, Block 77 is performed.

In Block 76, a returning address of the breakpoint processing is modified into a destination address of equivalent codes of the function (e.g. the function 2) that generates the breakpoint exception, and Block 78 is performed.

In Block 77, a returning address of the breakpoint processing is modified into an address of the patch function (e.g. the patch function 2) in the patch region corresponding to the function that generates the breakpoint exception, and Block 78 is performed.

In Block 78, the breakpoint exception processing is returned.

In this embodiment, when performing the replacements among a plurality of functions at the same time, the thread generates equivalent codes for the primitive functions to be replaced. Depending upon a version of a function previously invoked by the thread (i.e. according to the fact whether the function previously invoked by the thread is a primitive function or a patch function), the thread modifies an address after the breakpoint into an address for executing the equivalent codes or an address for executing the patch function, thereby effectively ensuring the atomicity among the plurality of functions invoked by the thread. In particular, if the thread previously invokes a primitive function, the thread returns an address for executing the equivalent codes of the primitive function after breakpoint processing. If the thread previously invokes a patch function of another function, an address for executing the patch function is returned after breakpoint processing, thereby preventing the thread from alternately executing the primitive function and the patch function in order to avoid an execution failure of the thread caused by the asynchronous parameter information between the primitive function and the patch function of the primitive function.

Figure 8:
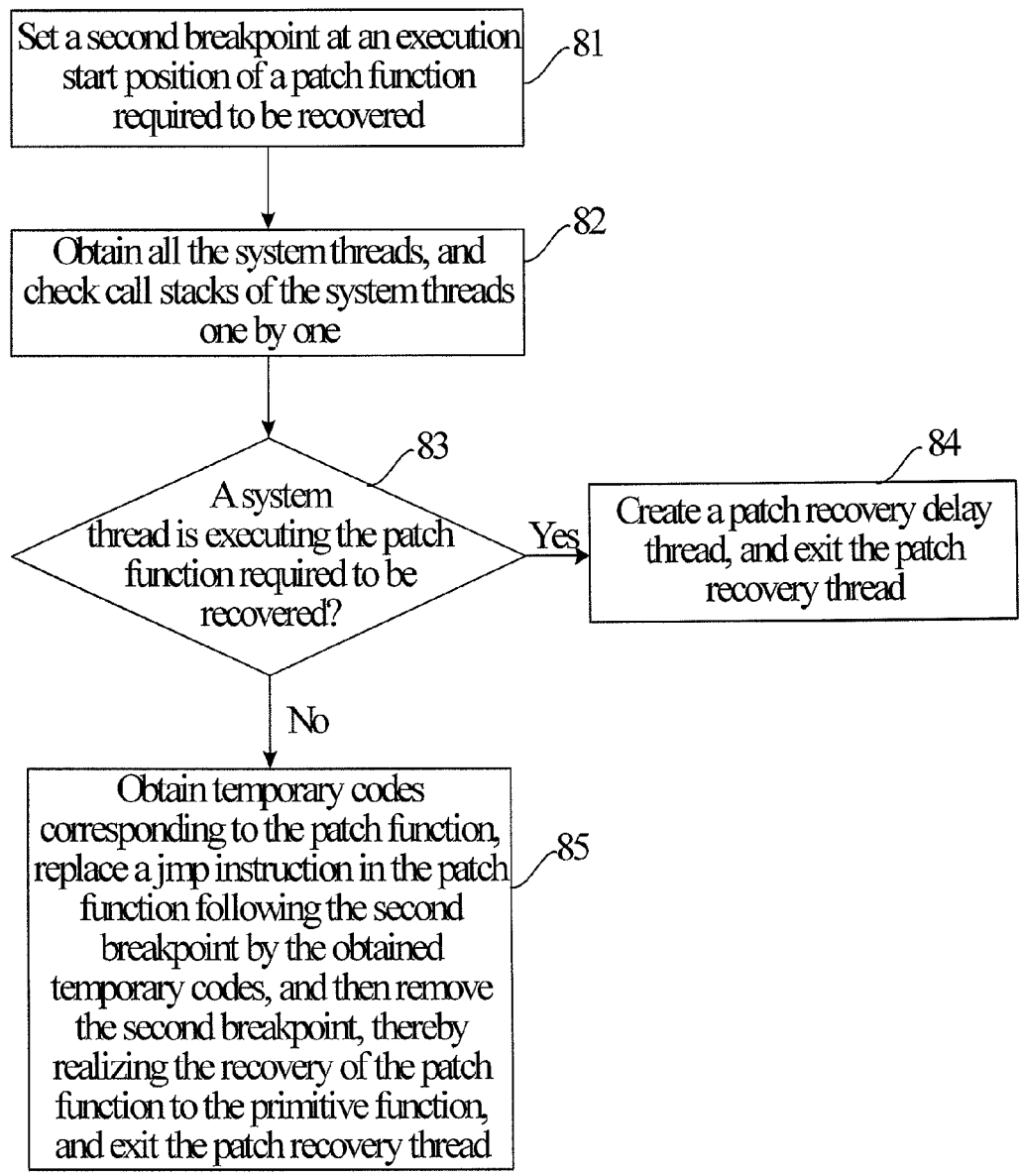
FIG. 8 is a flow chart showing a method for recovering a patch function according to a seventh embodiment of the present disclosure.

FIG. 8 is a flow chart of a method for recovering a patch function according to a seventh embodiment of the present disclosure. In this embodiment, after the patch function becomes valid, the validated patch function can be recovered to the primitive function before patching. In practice, the method for recovering a patch function to a primitive function during the operation of the kernel is similar to the method for "replacing" a primitive function with a patch function during the operation of the kernel. Therefore, the recovery of the patch function includes creating a thread with a common priority, setting a breakpoint in the patch function, and implementing the patch function recovery control by using the stored temporary codes of the primitive function (referring to the description of Block 312 in the embodiment of FIG. 3), in which the thread is called a patch recovery thread. Referring to FIG. 8, the following blocks are performed during the execution of the patch validation thread.

In Block 81, a breakpoint is set at an execution start position of a patch function required to be recovered. The breakpoint is a second breakpoint in this embodiment of the present disclosure.

In Block 82, all the threads currently running in the system (referred to as "system threads" hereinafter) are obtained, and call stacks of the system threads are checked one by one.

In Block 83, it is determined whether a system thread is executing the patch function required to be recovered according to the call stacks of the thread. If a system thread is executing the patch function required to be recovered according to the call stacks of the thread, Block 84 is performed. Otherwise, Block 85 is performed.

In Block 84, a kernel thread configured to perform patch recovery delay control, i.e., a kernel thread configured to delay the recovery of a patch function to a corresponding primitive function (referred to as a "patch recovery delay thread" hereinafter), is created. The patch recovery delay thread selects an appropriate time to perform the patch recovery delay control. Afterwards, the patch recovery thread is exited, and the process ends.

Figure 9:
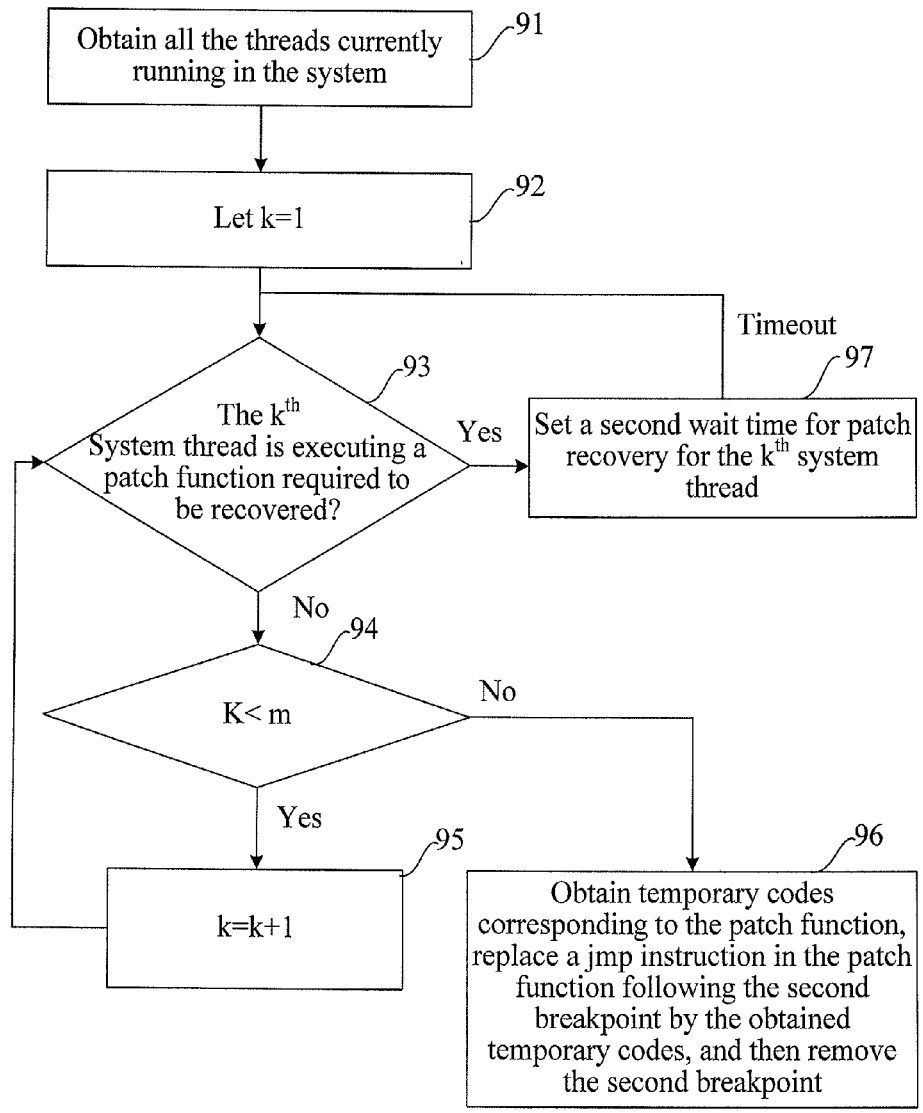
FIG. 9 is a flow chart showing a method for realizing patch recovery delay control according to an eighth embodiment of the present disclosure.

A method for realizing the patch recovery delay control may be obtained with reference to the description of an embodiment shown in FIG. 9.

In Block 85, temporary codes corresponding to the patch function are obtained according to the established third corresponding relation among the temporary codes, a source address of the primitive function, and a destination address of the patch function, a jmp instruction in the patch function following the second breakpoint is replaced by the obtained temporary codes, and then the second breakpoint is removed, thereby realizing the recovery of the patch function to the primitive function. Afterwards, the patch recovery thread is exited, and the process ends.

In this embodiment, after the kernel is patched, if the patching needs to be canceled, the validated patch function can be recovered to the primitive function before patching during the operation of the kernel according to the technical solution of this embodiment, thereby improving the flexibility of the online patching.

FIG. 9 is a flow chart of a method for realizing patch recovery delay control according to an eighth embodiment of the present disclosure. In this embodiment, a thread with a common priority is created to perform the patch recovery delay control, that is, a patch recovery delay thread is created. Referring to FIG. 9, the following blocks are performed during the execution of the patch recovery delay thread.

In Block 91, all the threads currently running in the system are obtained.

After all the current system threads are obtained, call stacks of the system threads are checked one by one. It is assumed that m system threads are obtained, in which m is an integer greater than 0, and k represents a sequence number of a currently analyzed thread.

In Block 92, let k=1.

In Block 93, it is determined whether a kth system thread is executing a patch function required to be recovered according to a patch file. If a kth system thread is executing a patch function required to be recovered according to a patch file, Block 97 is performed. Otherwise, Block 94 is performed.

In Block 94, it is determined whether k<m is satisfied or not. If k<m, Block 95 is performed. Otherwise, Block 96 is performed.

In Block 95, k=k+1, and Block 93 is performed.

In Block 96, temporary codes corresponding to the patch function are obtained according to the established third corresponding relation among the temporary codes, a source address of the primitive function, and a destination address of the patch function, a jmp instruction in the patch function following the second breakpoint is replaced by the obtained temporary codes, and then the second breakpoint is removed, thereby realizing the recovery of the patch function to the primitive function. Afterwards, the patch recovery delay thread is exited, and the process ends.

In Block 97, a second wait time for patch recovery is set for the k$^{th}$ system thread, and Block 93 is repeated after the second wait time has been set.

The second wait time for patch recovery of the system thread is determined according to a time required by the thread to execute the function, a scheduling frequency of the CPU, or other factors. For example, the second wait time for patch recovery is set to 10 ms.

In this embodiment, when the system thread is executing a patch function currently required to be recovered, a second wait time for patch recovery delay is set so that a patch recovery process is performed when the system thread does not invoke the patch function currently required to be recovered. The system thread is prevented from being interrupted during the patch recovery process, thereby shortening the response time of the system interruption and improving the system performance.

Figure 10:
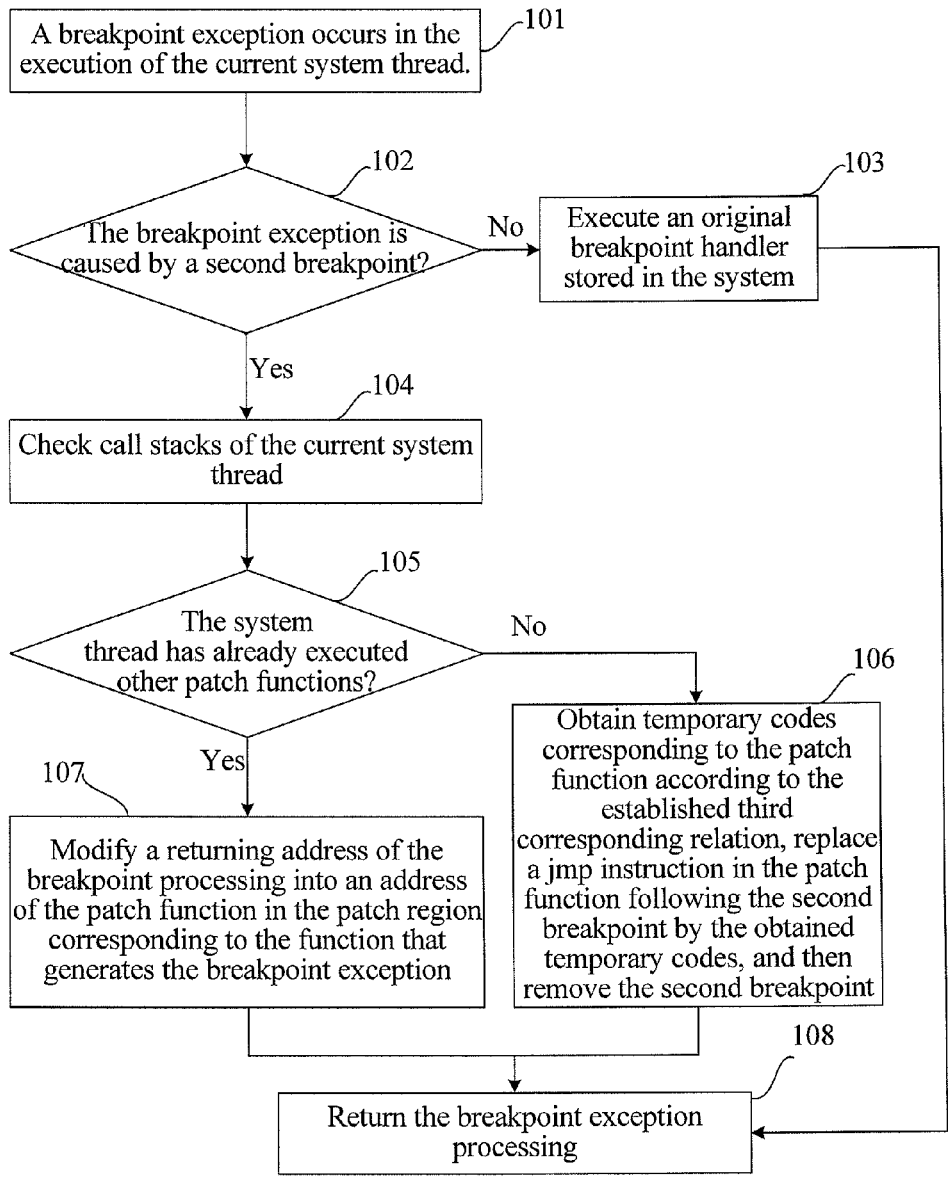
FIG. 10 is a flow chart showing a method for processing a breakpoint exception in a patch function recovery process according to a ninth embodiment of the present disclosure.

FIG. 10 is a flow chart of a method for processing a breakpoint exception in a patch function recovery process according to a ninth embodiment of the present disclosure. During a recovery delay period set by the patch recovery delay thread (e.g. during a second wait time set by the patch recovery delay thread) when a breakpoint exception occurs during the operation of the system thread in the application scenario as shown in FIG. 6 due to the second breakpoint set in the patch recovery process, the method of this embodiment is applied for processing the breakpoint exception. Referring to FIG. 10, the method of this embodiment is illustrated as follows.

In this embodiment, the following blocks are performed during the execution of the current system thread.

In Block 101, it is assumed that a breakpoint is discovered when the current system thread executes the function 2.

In Block 102, a cause of the breakpoint exception is determined, and if the breakpoint exception is caused by a second breakpoint set during the recovery of the patch function, Block 104 is performed. Otherwise, Block 103 is performed.

In Block 103, the breakpoint exception is processed by a breakpoint exception processing method in the prior art, and Block 108 is performed after the processing is finished.

In Block 104, call stacks of the current system thread are checked.

In Block 105, according to the call stacks of the current system thread, it is determined whether the current system thread has executed other patch functions (e.g. the patch function 1) before the breakpoint exception occurs. If current system thread has executed other patch functions before the breakpoint exception occurs, Block 107 is performed. Otherwise, Block 106 is performed.

In Block 106, temporary codes corresponding to the patch function are obtained according to the established third corresponding relation among the temporary codes, a source address of the primitive function and a destination address of the patch function, a jmp instruction in the patch function following the second breakpoint is replaced by the obtained temporary codes, and then the second breakpoint is removed, thereby realizing the recovery of the patch function to the primitive function. Afterwards, Block 108 is performed.

In Block 107, a returning address of the breakpoint processing is modified into an address of the patch function (e.g. the patch function 2) in the patch region corresponding to the function that generates the breakpoint exception, and Block 108 is performed.

In Block 108, the breakpoint exception processing is returned.

In this embodiment, the atomicity among a plurality of patch functions when being recovered by the thread is effectively ensured, thereby preventing the thread from alternately executing the primitive function and the patch function in order to avoid an execution failure of the thread caused by the asynchronous parameter information between the primitive function and the patch function of the primitive function.

In this embodiment, when the system thread is executing a patch function currently required to be recovered, a second wait time for patch recovery delay is set so that a patch function recovery process is performed when the system thread does not invoke the patch function currently required to be recovered, and the system thread is prevented from being interrupted during the patch recovery process, thereby shortening the response time of the system interruption, and improving the system performance.

Figure 11:
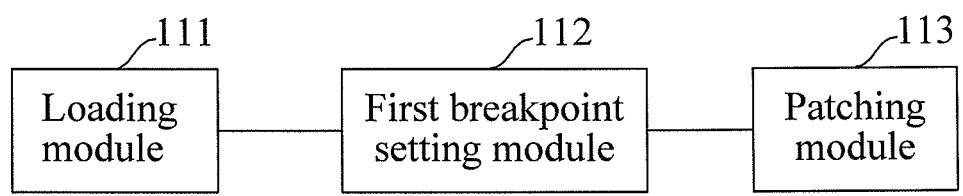
FIG. 11 is a schematic structural diagram showing a kernel online patching management device according to a tenth embodiment of the present disclosure.

FIG. 11 is a schematic structural view of a kernel online patching management device according to a tenth embodiment of the present disclosure. Referring to FIG. 11, the kernel online patching management device of this embodiment includes a loading module 111, a first breakpoint setting module 112, and a patching module 113.

The loading module 111 is configured to load a pre-generated patch file in an operating system. The patch file includes a patch function corresponding to a primitive function of a system kernel, and a first corresponding relation between a source address of the primitive function and a destination address of the patch function.

The first breakpoint setting module 112 is configured to set a first breakpoint at an execution start position of the primitive function.

The patching module 113 is configured to modify a returning execution address of the first breakpoint into the destination address of the patch function corresponding to the primitive function according to the first corresponding relation when a system thread executes the primitive function and a breakpoint exception occurs during the thread execution process due to the first breakpoint, and then remove the first breakpoint.

The kernel online patching management device of this embodiment is helpful for shortening the response time of the system thread and exerting a small impact on the normal operation of the operating system. Moreover, as the kernel online patching is realized by setting a breakpoint and modifying a returning execution address of the breakpoint, after the kernel online patching is completed, the patch function becomes valid without restarting the operating system, thereby satisfying the high reliability requirements of carrier-class products.

The kernel online patching management device of this embodiment may be a module that can be identified by the operating system and capable of loading a patch file which is first loaded in the operating system, and then performs loading, validation, recovery, and other processes on the patch file, thereby improving the applicability of the kernel online patching in different operating systems.

Figure 12:
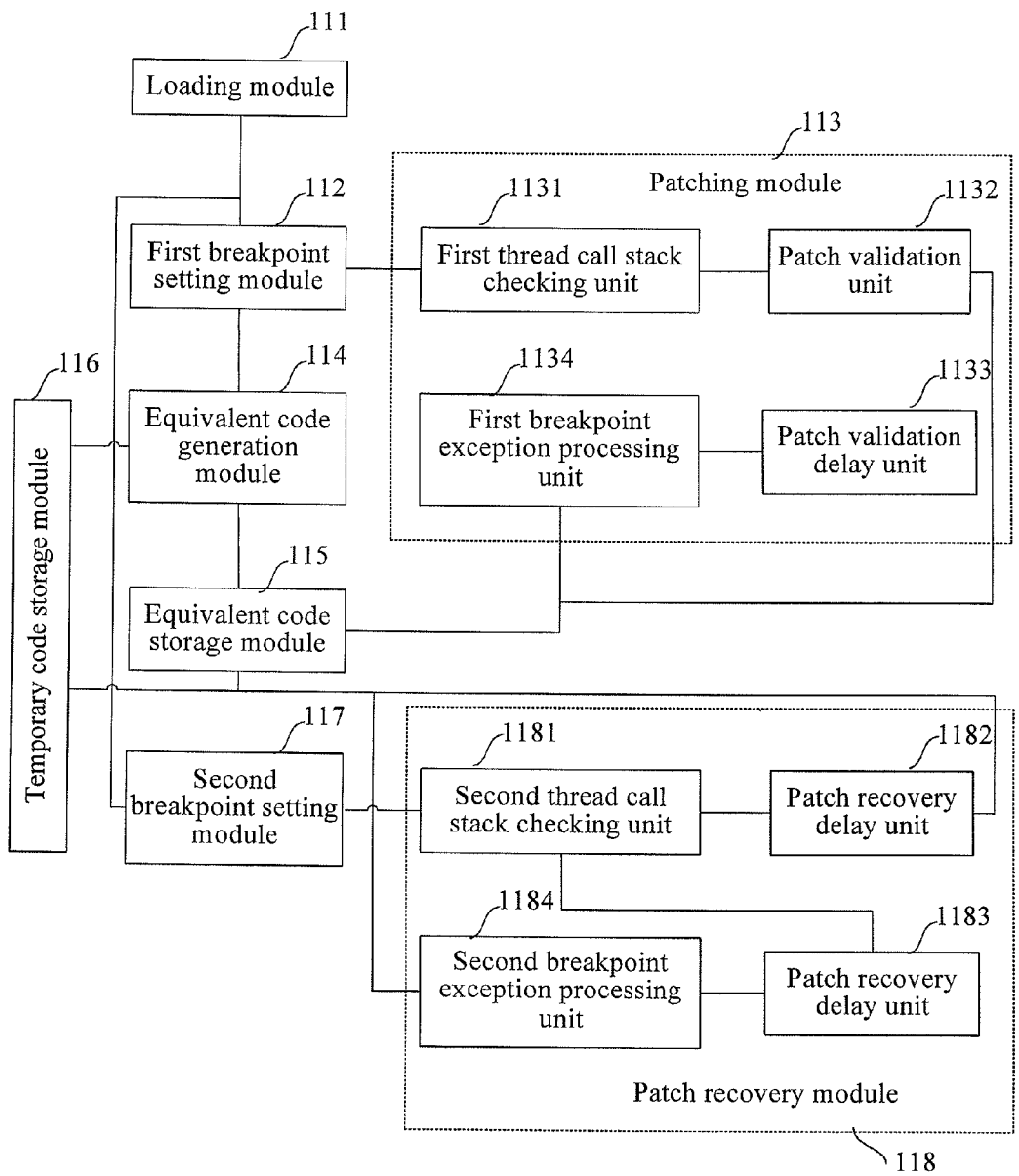
FIG. 12 is a schematic structural diagram showing a kernel online patching management device according to an eleventh embodiment of the present disclosure.

FIG. 12 is a schematic structural view of a kernel online patching management device according to an eleventh embodiment of the present disclosure. Different from the embodiment in FIG. 11, the kernel online patching management device of this embodiment further includes an equivalent code generation module 114 and an equivalent code storage module 115.

The equivalent code generation module 114 is configured to determine temporary codes beginning from an initial code in the primitive function and having a byte number corresponding to that required by an unconditional jump instruction and generate equivalent codes corresponding to the temporary codes. An end position of the equivalent codes includes the unconditional jump instruction. Thus, after executing the equivalent codes, the system thread jumps to execute the other codes except the temporary codes in the primitive function. A method for generating the equivalent codes may be obtained with reference to the description of the embodiment shown in FIG. 4 therefore the details will not be described herein again.

The equivalent code storage module 115 is configured to store the equivalent codes and establish a second corresponding relation among a destination address of the equivalent codes, a source address of the primitive function, and a destination address of the patch function.

Based on the above technical solution, in order to prevent the patch function validation process from affecting the normal operation of the system thread and ensure the atomicity of at least two functions invoked by the thread in the patch function validation process, the patching module 113 of this embodiment further includes a first thread call stack checking unit 1131, a patch validation unit 1132, a patch validation delay unit 1133, and a first breakpoint exception processing unit 1134.

The first thread call stack checking unit 1131 is configured to obtain all the threads currently running in the operating system and check call stacks of all the obtained threads.

The patch validation unit 1132 is configured to modify a returning execution address of the first breakpoint into the destination address of the patch function corresponding to the primitive function according to the first corresponding relation when a checking result indicates that no thread is executing the primitive function required to be patched. A process of realizing the patch validation control may be obtained with reference to the description of the embodiment shown in FIG. 3, and the details will not be described herein again.

The patch validation delay unit 1133 is configured to set a first wait time when a checking result indicates that a certain thread is executing the primitive function required to be patched and to activate the first thread call stack checking unit 1131 to repeatedly check the call stacks of the corresponding thread after the first wait time has been set. A process of realizing the patch validation delay control may be obtained with reference to the description of the embodiment shown in FIG. 5 therefore the details will not be described herein again.

The first breakpoint exception processing unit 1134 is configured to check the call stacks of the thread that is executing the primitive function required to be patched and to modify a returning execution address of the first breakpoint into a destination address of the equivalent codes corresponding to the primitive function that generates a breakpoint exception according to the second corresponding relation when a checking result indicates that the current thread has executed other primitive functions before the breakpoint exception occurs. Otherwise, modify a returning execution address of the first breakpoint into a destination address of the patch function corresponding to the primitive function that generates a breakpoint exception according to the first corresponding relation. A method for processing the first breakpoint exception may be obtained with reference to the description of the embodiment shown in FIG. 7 therefore the details will not be described herein again.

Based on the above technical solution, the kernel online patching management device of this embodiment further includes a temporary code storage module 116.

The temporary code storage module 116 is configured to store the temporary codes and establish a third corresponding relation among the temporary codes, a destination address of the equivalent codes, a source address of the primitive function, and a destination address of the patch function.

Based on the above technical solution, in order to recover the validated patch function to the primitive function before patching, the kernel online patching management device of this embodiment further includes a second breakpoint setting module 117 and a patch recovery module 118.

The second breakpoint setting module 117 is configured to set a second breakpoint at an execution start position of the patch function.

The patch recovery module 118 is configured to obtain temporary codes corresponding to the patch function according to the third corresponding relation when the system thread executes the patch function and a breakpoint exception occurs during the thread execution process due to the second breakpoint and recover the patch function to the primitive function corresponding to the patch function according to the obtained temporary codes.

Based on the above technical solution, in order to prevent the patch function recovery process from affecting the normal operation of the system thread and ensure the atomicity of at least two functions invoked by the thread in the patch function recovery process, the patch recovery module 118 of this embodiment further includes a second thread call stack checking unit 1181, a patch recovery unit 1182, a patch recovery delay unit 1183, and a second breakpoint exception processing unit 1184.

The second thread call stack checking unit 1181 is configured to obtain all the threads currently running in the operating system and check the call stacks of all the obtained threads.

The patch recovery unit 1182 is configured to recover the patch function to the primitive function according to the obtained temporary codes when a checking result indicates that no thread is executing the patch function required to be recovered. A method for realizing the patch recovery may be obtained with reference to the description of the embodiment shown in FIG. 8 therefore the details will not be described herein again.

The patch recovery delay unit 1183 is configured to set a second wait time when a checking result indicates that a thread is executing the patch function required to be recovered and to activate the second thread call stack checking unit 1181 to repeatedly check the call stacks of the corresponding thread after the second wait time has been set. A method for realizing the patch recovery delay may be obtained with reference to the description of the embodiment shown in FIG. 9 therefore the details will not be described herein again.

The second breakpoint exception processing unit 1184 is configured to check the call stacks of the thread that is executing the patch function required to be recovered and to recover the patch function to the primitive function according to the obtained temporary codes when a checking result indicates that the current thread has executed other primitive functions before the breakpoint exception occurs. Otherwise, set a returning execution address of the second breakpoint into the destination address of the patch function according to the first corresponding relation. A method for processing the second breakpoint exception may be obtained with reference to the description of the embodiment shown in FIG. 10 therefore the details will not be described herein again.

In this embodiment, a breakpoint is set in the primitive function required to be patched and equivalent codes are generated for the codes overwritten by an unconditional jump instruction in the primitive function. Thus, during the patch file validation process, if the system thread invokes several functions, the atomicity among the functions is ensured. Furthermore, the codes overwritten by the unconditional jump instruction (i.e. temporary codes defined in this embodiment)

in the primitive function are backed up so that the patch function already being validated after patching can be recovered to the primitive function before patching according to the stored temporary codes, thereby enhancing the flexibility of the kernel online patching.

Figure 13:
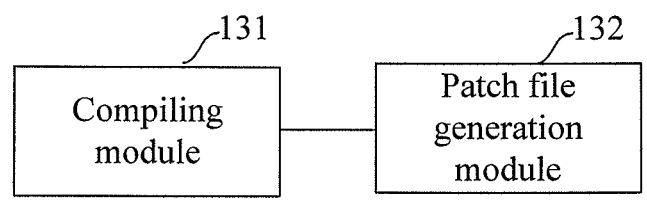
FIG. 13 is a schematic structural diagram showing a kernel patch generation device according to a twelfth embodiment of the present disclosure.

FIG. 13 is a schematic structural view of a kernel patch generation device according to a twelfth embodiment of the present disclosure. Referring to FIG. 13, the kernel patch generation device of this embodiment includes a compiling module 131 and a patch file generation module 132.

The compiling module 131 is configured to compile a patch source code to obtain an object file.

The patch file generation module 132 is configured to generate a patch file according to the object file. The patch file includes a patch function corresponding to a primitive function of a system kernel and a first corresponding relation between a source address of the primitive function and a destination address of the patch function.

The kernel patch generation device of this embodiment only needs to compile one copy of source code (i.e. the source code before the modification of the kernel) to obtain an object file instead of compiling two copies of source codes (i.e. the source code before the modification of the kernel and the patch source code after the modification of the kernel), thereby shortening the compiling time of the source code and reducing the compiling cost. A process of generating a patch file by the kernel patch generation device may be obtained with reference to the description of the embodiment shown in FIG. 2 therefore the details will not be described herein again.

Figure 14:
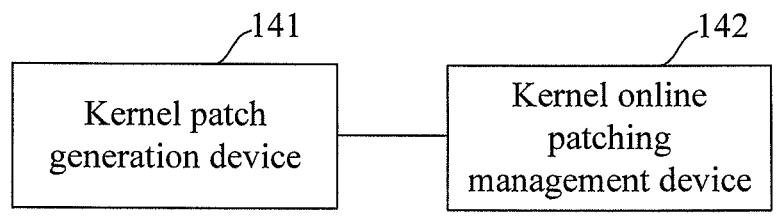
FIG. 14 is a schematic structural diagram showing a system for realizing kernel online patching according to a thirteenth embodiment of the present disclosure.

FIG. 14 is a schematic structural view of a system for realizing kernel online patching according to a thirteenth embodiment of the present disclosure. Referring to FIG. 14, the system includes a kernel patch generation device 141 and a kernel online patching management device 142.

The kernel patch generation device 141 is configured to compile a patch source code to obtain an object file and generate a patch file according to the object file. The patch file includes a patch function corresponding to a primitive function of a system kernel and a first corresponding relation between a source address of the primitive function and a destination address of the patch function. A detailed structure of the kernel patch generation device may be obtained with reference to the description of the embodiment shown in FIG. 13 therefore the details will not be described herein again.

The kernel online patching management device 142 is configured to load the patch file in an operating system, set a first breakpoint at an execution start position of the primitive function, modify a returning execution address of the first breakpoint into the destination address of the patch function corresponding to the primitive function according to the first corresponding relation when a system thread executes the primitive function and a breakpoint exception occurs during the thread execution process due to the first breakpoint, and then remove the first breakpoint. A detailed structure of the kernel online patching management device may be obtained with reference to the description of the embodiments shown in FIGS. 11 and 12 therefore the details will not be described herein again.

In this embodiment, the kernel online patching is realized without specifically creating a thread with the highest priority for each CPU in the system so as not to interrupt the operation of the original threads in the system, thereby shortening the response time of the system thread and exerting a small impact on the normal operation of the operating system. Moreover, the patch function becomes valid without restarting the operating system, thereby satisfying the high reliability requirements of carrier-class products. In addition, the kernel online patching management device of this embodiment performs the loading, validation, recovery, and other processes on the patch file in order to improve the applicability of the kernel online patching in different operating systems.

It should be understood by persons of ordinary skill in the art that the accompanying drawings are merely schematic views of some exemplary embodiments, and modules or processes in the accompanying drawings are not indispensable for implementing the present disclosure.

It should be understood by persons of ordinary skill in the art that, modules in a device according to an embodiment may be distributed in the device of the embodiment according to the description of the embodiment, or correspondingly disposed in one or more devices different from this embodiment. The modules of the above embodiment may be combined into one module, or further divided into a plurality of sub-modules.

The sequence numbers of the above embodiments of the present disclosure are merely for the convenience of description, and do not imply the preference among the embodiments.

Persons of ordinary skill in the art should understand that all or a part of the blocks of the method according to the embodiments of the present disclosure may be implemented by a program instructing relevant hardware. The program may be stored in a computer readable storage medium. When the program is run, the blocks of the method according to the embodiments of the present disclosure are performed. The storage medium may be any medium that is capable of storing program codes, such as a ROM, a RAM, a magnetic disk, or an optical disk.

Finally, it should be noted that the above embodiments are merely provided for describing the technical solutions of the present disclosure, but not intended to limit the present disclosure. It should be understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A method for realizing kernel online patching of an object file, comprising:
    loading a pre-generated patch file in an operating system, wherein the patch file comprises a patch function corresponding to a primitive function of a system kernel and a first corresponding relation between a source address of the primitive function and a destination address of the patch function, wherein the patch file is for patching the object file;
    setting a first breakpoint at an execution start position of the primitive function; and
    when a system thread executes the primitive function and a breakpoint exception occurs during the thread execution process due to the first breakpoint, modifying a returning execution address of the first breakpoint into the destination address of the patch function corresponding to the primitive function according to the first corresponding relation and removing the first breakpoint; wherein:
        the object file comprises symbolic information and relocation information of the patch function of a patch source code;

the patch file further comprises shift relocation information corresponding to the symbolic information and the relocation information, a predetermined default patch loading address, and information about a size of a space required by the pre-generated patch file during running; and the loading of the pre-generated patch file in the operating system comprising:
when a memory capacity of a patch region in the system is smaller than a size of a space required by the patch file during running, allocating a new memory including a new memory address to the patch region for the loading of the patch file;
comparing the default patch loading address with the new memory address of the patch region;
if the default patch loading address and the new memory address are identical, replicating patch data carried in the patch file to the new memory of the patch region;
if the default patch loading address and the new memory address are not identical, relocating a destination address of the patch data carried in the patch file according to the shift relocation information and replicating relocated patch data to the new memory of the patch region;
wherein the patch data comprises the patch function corresponding to the primitive function of the system kernel and the first corresponding relation between the source address of the primitive function and the destination address of the patch function.

2. The method of claim 1, wherein before setting the first breakpoint at the execution start position of the primitive function, the method further comprising:
determining temporary codes beginning from an initial code in the primitive function, and having a byte number corresponding to that required by an unconditional jump instruction;
generating equivalent codes corresponding to the temporary codes, wherein an end position of the equivalent codes comprises the unconditional jump instruction;
storing the equivalent codes; and
establishing a second corresponding relation among a destination address of the equivalent codes, the source address of the primitive function, and the destination address of the patch function.

3. The method of claim 1, wherein the modifying the returning execution address of the first breakpoint into the destination address of the patch function corresponding to the primitive function according to the first corresponding relation, and the removing of the first breakpoint comprising:
obtaining all threads currently running in the operating system;
checking call stacks of all the obtained threads; and
modifying the returning execution address of the first breakpoint into the destination address of the patch function corresponding to the primitive function according to the first corresponding relation when a checking result indicates that no thread is executing the primitive function, which is required for the patching.

4. The method of claim 3, further comprising:
setting a first wait time when the checking result indicates that a certain thread is executing the primitive function required to be patched; and
checking repeatedly the call stacks of the corresponding thread after the first wait time has been set.

5. The method of claim 4, wherein when the checking result indicates that the certain thread is executing the primitive function required to be patched, the method further comprising:
checking the call stacks of the certain thread that is executing the primitive function required to be patched;
modifying the returning execution address of the first breakpoint into a destination address of equivalent codes corresponding to the primitive function that generates the breakpoint exception according to the second corresponding relation when the checking result indicates that the current thread has executed other primitive functions before the breakpoint exception occurs; and
modifying the returning execution address of the first breakpoint into the destination address of the patch function corresponding to the primitive function that generates the breakpoint exception according to the first corresponding relation when the checking result indicates that the current thread has not executed other primitive functions before the breakpoint exception occurs.

6. The method of claim 2, further comprising:
storing the temporary codes; and
establishing a third corresponding relation among the temporary codes, the destination address of the equivalent codes, the source address of the primitive function, and the destination address of the patch function.

7. The method of claim 6, further comprising:
setting a second breakpoint at the execution start position of the patch function;
obtaining temporary codes corresponding to the patch function according to the third corresponding relation when the system thread executes the patch function and the breakpoint exception occurs during the thread execution process due to the second breakpoint; and
recovering the patch function to the primitive function corresponding to the patch function according to the obtained temporary codes.

8. The method of claim 7, wherein the recovering the patch function to the primitive function corresponding to the patch function according to the temporary codes comprising:
obtaining all threads currently running in the operating system;
checking call stacks of all the obtained threads; and
recovering the patch function to the primitive function according to the obtained temporary codes when a checking result indicates that no thread is executing the patch function which is to be recovered.

9. The method of claim 8, further comprising:
setting a second wait time when the checking result indicates that a thread is executing the patch function required to be recovered; and
checking repeatedly the call stacks of the corresponding thread after the second wait time has been set.

10. The method of claim 9, further comprising:
checking the call stacks of the thread that is executing the patch function required to be recovered;
recovering the patch function to the primitive function according to the obtained temporary codes when the checking result indicates that the current thread has executed other primitive functions before the breakpoint exception occurs; and
setting a returning execution address of the second breakpoint into the destination address of the patch function according to the first corresponding relation when the checking result indicates that the current thread has executed other primitive functions before the breakpoint exception occurs.

11. A computer with a kernel online patching management device, wherein the kernel online patching management device comprises:
- a loading module configured to load a pre-generated patch file in an operating system, wherein the patch file comprises a patch function corresponding to a primitive function of a system kernel and a first corresponding relation between a source address of the primitive function and a destination address of the patch function;
- a first breakpoint setting module configured to set a first breakpoint at an execution start position of the primitive function;
- a patching module configured to modify a returning execution address of the first breakpoint into the destination address of the patch function corresponding to the primitive function according to the first corresponding relation and remove the first breakpoint when a system thread executes the primitive function and a breakpoint exception occurs during the thread execution process due to the first breakpoint;
- an equivalent code generation module configured to:
  - determine temporary codes beginning from an initial code in the primitive function and having a byte number corresponding to that required by an unconditional jump instruction, and
  - generate equivalent codes corresponding to the temporary codes, wherein an end position of the equivalent codes comprises the unconditional jump instruction; and
- an equivalent code storage module configured to store the equivalent codes and to establish a second corresponding relation among a destination address of the equivalent codes, the source address of the primitive function, and the destination address of the patch function;
- wherein the patching module comprises:
  - a first thread call stack checking unit, configured to obtain all threads currently running in the operating system and to check call stacks of all the obtained threads;
  - a patch validation unit, configured to modify the returning execution address of the first breakpoint into the destination address of the patch function corresponding to the primitive function according to the first corresponding relation, when a checking result indicates that no thread is executing the primitive function, which is required for the patching;
  - a patch validation delay unit, configured to set a first wait time when the checking result indicates that a certain thread is executing the primitive function, which is required for the patching, and to activate the first thread call stack checking unit to repeatedly check call stacks of the corresponding thread after the first wait time has been set; and
  - a first breakpoint exception processing unit configured to:
    - check the call stacks of the certain thread that is executing the primitive function, which is required for the patching,
    - modify the returning execution address of the first breakpoint into the destination address of the equivalent codes corresponding to the primitive function that generates the breakpoint exception according to the second corresponding relation when the checking result indicates that the current thread has executed other primitive functions before the breakpoint exception occurs and,
    - when the checking result indicates that the current thread has not executed other primitive functions before the breakpoint exception occurs, modify the returning execution address of the first breakpoint into the destination address of the patch function corresponding to the primitive function that generates the breakpoint exception according to the first corresponding relation.

12. The computer of claim 11, wherein the device further comprises:
- a temporary code storage module configured to store the temporary codes and to establish a third corresponding relation among the temporary codes, the destination address of the equivalent codes, the source address of the primitive function, and the destination address of the patch function.

13. The computer of claim 12, wherein the kernel online patching management device further comprises:
- a second breakpoint setting module, configured to set a second breakpoint at an execution start position of the patch function; and
- a patch recovery module, configured to obtain temporary codes corresponding to the patch function according to the third corresponding relation when the system thread executes the patch function and the breakpoint exception occurs during the thread execution process due to the second breakpoint and to recover the patch function to the primitive function corresponding to the patch function according to the obtained temporary codes.

14. The computer of claim 13, wherein the patch recovery module comprises:
- a second thread call stack checking unit configured to obtain all threads currently running in the operating system and check call stacks of all the obtained threads;
- a patch recovery unit configured to recover the patch function to the primitive function according to the obtained temporary codes when a checking result indicates that no thread is executing the patch function which is to be recovered;
- a patch recovery delay unit configured to set a second wait time when the checking result indicates that a thread is executing the patch function which is to be recovered and to activate the second thread call stack checking unit to repeatedly check the call stacks of a corresponding thread after the second wait time has been set; and
- a second breakpoint exception processing unit configured to check the call stacks of the thread that is executing the patch function which is to be recovered and to recover the patch function to the primitive function according to the obtained temporary codes when the checking result indicates that the current thread has executed other primitive functions before the breakpoint exception occurs and, when the checking result indicates that the current thread has not executed other primitive functions before the breakpoint exception occurs, set a returning execution address of the second breakpoint into the destination address of the patch function according to the first corresponding relation.

15. A method for realizing kernel online patching, comprising:
loading a pre-generated patch file in an operating system, wherein the patch file comprises a patch function corresponding to a primitive function of a system kernel and a first corresponding relation between a source address of the primitive function and a destination address of the patch function; setting a first breakpoint at an execution start position of the primitive function; when a system thread executes the primitive function and a breakpoint exception occurs during the thread execution process due to the first breakpoint, obtaining all threads currently running in the operating system;

checking call stacks of all the obtained threads;

modifying the returning execution address of the first breakpoint into the destination address of the patch function corresponding to the primitive function according to the first corresponding relation when a checking result indicates that no thread is executing the primitive function which is required for the patching;

setting a first wait time when the checking result indicates that a certain thread is executing the primitive function which is required for the patching; and checking repeatedly the call stacks of the corresponding thread after the first wait time has been set, checking the call stacks of the certain thread that is executing the primitive function required to be patched; modifying the returning execution address of the first breakpoint into a destination address of equivalent codes corresponding to the primitive function that generates the breakpoint exception according to a second corresponding relation when the checking result indicates that the current thread has executed other primitive functions before the breakpoint exception occurs; and modifying the returning execution address of the first breakpoint into the destination address of the patch function corresponding to the primitive function that generates the breakpoint exception according to the first corresponding relation when the checking result indicates that the current thread has not executed other primitive functions before the breakpoint exception occurs.

16. The method of claim 15, wherein before setting the first breakpoint at the execution start position of the primitive function, the method further comprising:

determining temporary codes beginning from an initial code in the primitive function and having a byte number corresponding to that required by an unconditional jump instruction;

generating equivalent codes corresponding to the temporary codes, wherein an end position of the equivalent codes comprises the unconditional jump instruction;

storing the equivalent codes; and establishing a second corresponding relation among a destination address of the equivalent codes, the source address of the primitive function, and the destination address of the patch function.

17. A method for realizing kernel online patching, comprising:

loading a pre-generated patch file in an operating system, wherein the patch file comprises a patch function corresponding to a primitive function of a system kernel and a first corresponding relation between a source address of the primitive function and a destination address of the patch function;

determining temporary codes beginning from an initial code in the primitive function and having a byte number corresponding to that required by an unconditional jump instruction;

generating equivalent codes corresponding to the temporary codes, wherein an end position of the equivalent codes comprises the unconditional jump instruction;

storing the equivalent codes;

establishing a second corresponding relation among a destination address of the equivalent codes, the source address of the primitive function, and the destination address of the patch function;

storing the temporary codes;

establishing a third corresponding relation among the temporary codes, the destination address of the equivalent codes, the source address of the primitive function, and the destination address of the patch function;

setting a first breakpoint at an execution start position of the primitive function; and when a system thread executes the primitive function and a breakpoint exception occurs during the thread execution process due to the first breakpoint, modifying a returning execution address of the first breakpoint into the destination address of the patch function corresponding to the primitive function according to the first corresponding relation and removing the first breakpoint;

setting a second breakpoint at the execution start position of the patch function;

obtaining temporary codes corresponding to the patch function according to the third corresponding relation when the system thread executes the patch function and the breakpoint exception occurs during the thread execution process due to the second breakpoint; and recovering the patch function to the primitive function corresponding to the patch function according to the obtained temporary codes.

18. The method of claim 17, wherein the recovering the patch function to the primitive function corresponding to the patch function according to the temporary codes comprising:

obtaining all threads currently running in the operating system;

checking call stacks of all the obtained threads; and recovering the patch function to the primitive function according to the obtained temporary codes when a checking result indicates that no thread is executing the patch function which is to be recovered.

19. The method of claim 18, further comprising:

setting a second wait time when the checking result indicates that a thread is executing the patch function which is to be recovered; and checking repeatedly the call stacks of the corresponding thread after the second wait time has been set.

20. The method of claim 19, further comprising:

checking the call stacks of the thread that is executing the patch function required to be recovered;

recovering the patch function to the primitive function according to the obtained temporary codes when the checking result indicates that the current thread has executed other primitive functions before the breakpoint exception occurs; and setting a returning execution address of the second breakpoint into the destination address of the patch function according to the first corresponding relation when the checking result indicates that the current thread has executed other primitive functions before the breakpoint exception occurs.

21. A computer with a kernel online patching management device, wherein the device comprises:

a loading module configured to load a pre-generated patch file in an operating system, wherein the patch file comprises a patch function corresponding to a primitive function of a system kernel and a first corresponding relation between a source address of the primitive function and a destination address of the patch function;

a first breakpoint setting module configured to set a first breakpoint at an execution start position of the primitive function;

a patching module configured to modify a returning execution address of the first breakpoint into the destination address of the patch function corresponding to the primitive function according to the first corresponding relation and remove the first breakpoint when a system thread executes the primitive function and a breakpoint exception occurs during the thread execution process due to the first breakpoint;

an equivalent code generation module configured to determine temporary codes beginning from an initial code in the primitive function and having a byte number corresponding to that required by an unconditional jump instruction and to generate equivalent codes corresponding to the temporary codes, wherein an end position of the equivalent codes comprises the unconditional jump instruction; and an equivalent code storage module configured to store the equivalent codes and to establish a second corresponding relation among a destination address of the equivalent codes, the source address of the primitive function, and the destination address of the patch function;

a temporary code storage module configured to store the temporary codes and to establish a third corresponding relation among the temporary codes, the destination address of the equivalent codes, the source address of the primitive function, and the destination address of the patch function;

a second breakpoint setting module configured to set a second breakpoint at an execution start position of the patch function; and a patch recovery module configured to obtain temporary codes corresponding to the patch function according to the third corresponding relation when the system thread executes the patch function and the breakpoint exception occurs during the thread execution process due to the second breakpoint and to recover the patch function to the primitive function corresponding to the patch function according to the obtained temporary codes.

22. The computer of claim 21, wherein the patch recovery module comprises:

a second thread call stack checking unit configured to obtain all threads currently running in the operating system and check call stacks of all the obtained threads;

a patch recovery unit configured to recover the patch function to the primitive function according to the obtained temporary codes when a checking result indicates that no thread is executing the patch function which is to be recovered;

a patch recovery delay unit configured to set a second wait time when the checking result indicates that a thread is executing the patch function which is to be recovered and to activate the second thread call stack checking unit to repeatedly check the call stacks of a corresponding thread after the second wait time has been set; and a second breakpoint exception processing unit configured to check the call stacks of the thread that is executing the patch function which is to be recovered and to recover the patch function to the primitive function according to the obtained temporary codes when the checking result indicates that the current thread has executed other primitive functions before the breakpoint exception occurs and, when the checking result indicates that the current thread has not executed other primitive functions before the breakpoint exception occurs, set a returning execution address of the second breakpoint into the destination address of the patch function according to the first corresponding relation.

* * * * *

UNITED STATES PATENT AND TRADEMARK OFFICE
CERTIFICATE OF CORRECTION

PATENT NO. : 8,499,289 B2  
APPLICATION NO. : 12/703409  
DATED : July 30, 2013  
INVENTOR(S) : Dai et al.

Page 1 of 1

It is certified that error appears in the above-identified patent and that said Letters Patent is hereby corrected as shown below:

On the Title Page

Item [56], under "U.S. PATENT DOCUMENTS", insert:

--20020112200  A1     8/15/2002     Hines--.

Signed and Sealed this
Twelfth Day of November, 2013

Teresa Stanek Rea
*Deputy Director of the United States Patent and Trademark Office*